US012627418B2

(12) United States Patent
Dudda et al.

(10) Patent No.: US 12,627,418 B2
(45) Date of Patent: May 12, 2026

(54) LOGICAL CHANNEL PRIORITIZATION WITHIN CONFIGURED GRANTS

(71) Applicant: Telefonaktiebolaget LM Ericsson (publ), Stockholm (SE)

(72) Inventors: Torsten Dudda, Wassenberg (DE); Zhenhua Zou, Solna (SE); Eda Genc, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 326 days.

(21) Appl. No.: 18/553,530

(22) PCT Filed: Apr. 1, 2022

(86) PCT No.: PCT/EP2022/058748
§ 371 (c)(1),
(2) Date: Sep. 29, 2023

(87) PCT Pub. No.: WO2022/207903
PCT Pub. Date: Oct. 6, 2022

(65) Prior Publication Data
US 2024/0187143 A1 Jun. 6, 2024

Related U.S. Application Data

(60) Provisional application No. 63/169,594, filed on Apr. 1, 2021.

(51) Int. Cl.
*H04L 1/1829* (2023.01)
*H04W 72/231* (2023.01)
*H04W 72/563* (2023.01)

(52) U.S. Cl.
CPC ......... *H04L 1/1854* (2013.01); *H04W 72/231* (2023.01); *H04W 72/563* (2023.01)

(58) Field of Classification Search
None
See application file for complete search history.

(56) References Cited

U.S. PATENT DOCUMENTS

2018/0159668 A1    6/2018  Phuyal et al.
2022/0070928 A1*   3/2022  Babaei ................ H04W 74/006
(Continued)

FOREIGN PATENT DOCUMENTS

CN            110535555 A    12/2019

OTHER PUBLICATIONS

"3GPP TS 38.211 V16.4.0", 3rd Generation Partnership Project; Technical Specification Group Radio Access Network; NR; Physical channels and modulation (Release 16), Dec. 2020, pp. 1-43.
(Continued)

*Primary Examiner* — Phirin Sam
(74) *Attorney, Agent, or Firm* — Murphy, Bilak & Homiller, PLLC

(57) ABSTRACT

Embodiments include methods for a user equipment (UE) configured to operate in a radio access network (RAN). Such methods include obtaining data for transmission during a particular one of a plurality of periodic occasions during which the UE has been granted resources for uplink data transmission. The data includes first and second protocol data units (PDUs) associated with respective first and second hybrid ARQ (HARQ) processes. At least one of the first and second PDUs is for retransmission after failed transmission during an earlier one of the occasions. Such methods include selecting the first PDU or the second PDU for transmission during the particular occasion based on at least one of the following: priorities of logical channels with data included in the first and second PDUs. and whether one or both of the first and second PDUs are for retransmission. Other embodiments include complementary methods for a RAN node.

21 Claims, 8 Drawing Sheets

(56) References Cited

U.S. PATENT DOCUMENTS

| | | | | |
|---|---|---|---|---|
| 2022/0158769 | A1 | 5/2022 | Gao et al. | |
| 2022/0183049 | A1* | 6/2022 | Lee | H04W 72/569 |
| 2022/0248479 | A1* | 8/2022 | Yu | H04W 76/20 |
| 2023/0337225 | A1* | 10/2023 | Alfarhan | H04W 72/1268 |
| 2023/0370925 | A1* | 11/2023 | Kim | H04W 36/00725 |
| 2024/0163938 | A1* | 5/2024 | Qiao | H04W 4/24 |
| 2024/0340857 | A1* | 10/2024 | Loehr | H04W 72/02 |
| 2025/0089059 | A1* | 3/2025 | Alfarhan | H04W 72/23 |

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP TS 38.321 V16.4.0", 3rd Generation Partnership Project; Technical Specification Group Radio Access Network; NR; Medium Access Control (MAC) protocol specification (Release 16), Mar. 2021, pp. 1-157.

"Enhancements for URLLC in unlicensed controlled environments", 3GPP TSG-RAN WG2 Meeting #113 electronic, E-meeting, R2-2100921, Jan. 25-Feb. 5, 2021, pp. 1-9.

"Main functions of intra-UE data-data prioritization", 3GPP TSG-RAN WG2 #107bis, Tdoc R2-1912555, Chongqing, China, Revision of R2-1909373, Oct. 14-18, 2019, pp. 1-6.

"Revised WID: Enhanced Industrial Internet of Things (IoT) and ultra-reliable and low latency communication (URLLC) support for NR", 3GPP TSG RAN Meeting #88e, RP-201310, Electronic meeting, Revision of RP-193233, Jun. 29-Jul. 3, 2020, pp. 1-6.

"Uplink enhancements for URLLC in UCE", 3GPP TSG-RAN WG2 Meeting #113-e, Online, R2-2100214, Jan. 25-Feb. 5, 2021, pp. 1-7.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

* cited by examiner

Mini-slot
(variable start and length)

slot

Slot (symbols 0-13)

Symbol with control channel
(and possibly data)

Symbol with data channel
(e.g., PDSCH or PUSCH)

```
ConfiguredGrantConfig ::=          SEQUENCE {
   frequencyHopping                    ENUMERATED {intraSlot, interSlot}                                       OPTIONAL,       -- Need S,
   cg-DMRS-Configuration               DMRS-UplinkConfig,
   mcs-Table                           ENUMERATED {qam256, qam64LowSE}                                         OPTIONAL,       -- Need S
   mcs-TableTransformPrecoder          ENUMERATED {qam256, qam64LowSE}                                         OPTIONAL,       -- Need S
   uci-OnPUSCH                         SetupRelease { CG-UCI-OnPUSCH }                                         OPTIONAL,       -- Need M
   resourceAllocation                  ENUMERATED { resourceAllocationType0, resourceAllocationType1, dynamicSwitch },
   rbg-Size                            ENUMERATED {config2}                                                    OPTIONAL,       -- Need S
   powerControlLoopToUse               ENUMERATED {n0, n1},
   p0-PUSCH-Alpha                      P0-PUSCH-AlphaSetId,
   transformPrecoder                   ENUMERATED {enabled, disabled}                                          OPTIONAL,       -- Need S
   nrofHARQ-Processes                  INTEGER (1..16),
   repK                                ENUMERATED {n1, n2, n4, n8},
   repK-RV                             ENUMERATED {s1-0231, s2-0303, s3-0000}                                  OPTIONAL,       -- Need R
   periodicity                         ENUMERATED {
                                         sym2, sym7, sym1x14, sym2x14, sym4x14, sym5x14, sym8x14, sym10x14, sym16x14,
                                         sym20x14, sym32x14, sym40x14, sym64x14, sym80x14, sym128x14, sym160x14, sym256x14,
                                         sym320x14, sym512x14, sym640x14, sym1024x14, sym1280x14, sym2560x14, sym5120x14, sym6,
                                         sym1x12, sym2x12, sym4x12, sym5x12, sym8x12, sym10x12, sym16x12, sym20x12, sym32x12,
                                         sym40x12, sym64x12, sym80x12, sym128x12, sym160x12, sym256x12, sym320x12, sym512x12,
                                         sym640x12, sym1280x12, sym2560x12
                                      },
   configuredGrantTimer                INTEGER (1..64)                                                         OPTIONAL,       -- Need R
   rrc-ConfiguredUplinkGrant           SEQUENCE {
      timeDomainOffset                    INTEGER (0..5119),
      timeDomainAllocation                INTEGER (0..15),
      frequencyDomainAllocation           BIT STRING (SIZE(18)),
      antennaPort                         INTEGER (0..31),
      dmrs-SeqInitialization              INTEGER (0..1)                                                       OPTIONAL,       -- Need R
      precodingAndNumberOfLayers          INTEGER (0..63),
      srs-ResourceIndicator               INTEGER (0..15)                                                      OPTIONAL,       -- Need R
      mcsAndTBS                           INTEGER (0..31),
      frequencyHoppingOffset              INTEGER (1..maxNrofPhysicalResourceBlocks-1)                         OPTIONAL,       -- Need R
      pathlossReferenceIndex              INTEGER (0..maxNrofPUSCH-PathlossReferenceRSs-1),
      ...
```

*FIG. 7A*

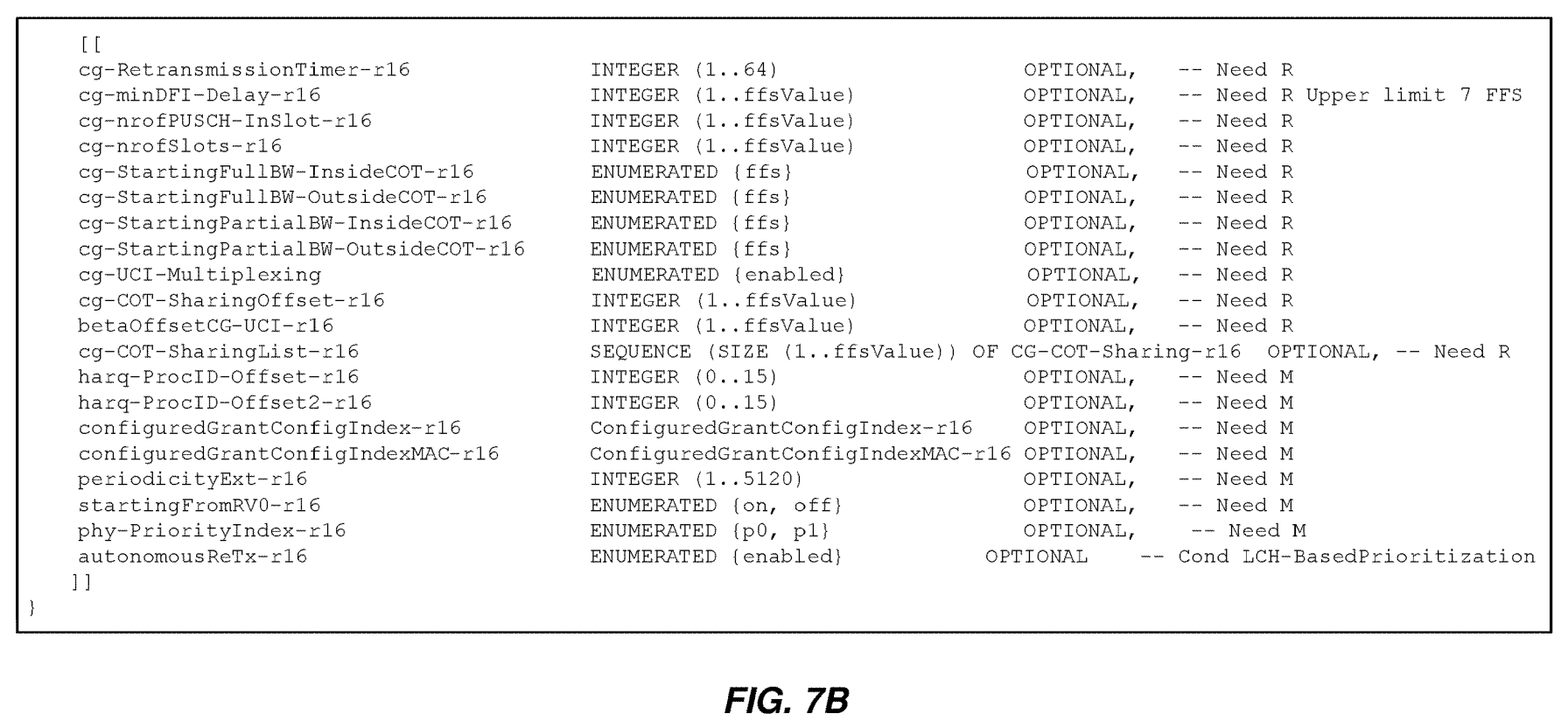

```
[[
cg-RetransmissionTimer-r16             INTEGER (1..64)                            OPTIONAL,    -- Need R
cg-minDFI-Delay-r16                    INTEGER (1..ffsValue)                      OPTIONAL,    -- Need R Upper limit 7 FFS
cg-nrofPUSCH-Inslot-r16                INTEGER (1..ffsValue)                      OPTIONAL,    -- Need R
cg-nrofSlots-r16                       INTEGER (1..ffsValue)                      OPTIONAL,    -- Need R
cg-StartingFullBW-InsideCOT-r16        ENUMERATED {ffs}                           OPTIONAL,    -- Need R
cg-StartingFullBW-OutsideCOT-r16       ENUMERATED {ffs}                           OPTIONAL,    -- Need R
cg-StartingPartialBW-InsideCOT-r16     ENUMERATED {ffs}                           OPTIONAL,    -- Need R
cg-StartingPartialBW-OutsideCOT-r16    ENUMERATED {ffs}                           OPTIONAL,    -- Need R
cg-UCI-Multiplexing                    ENUMERATED {enabled}                       OPTIONAL,    -- Need R
cg-COT-SharingOffset-r16               INTEGER (1..ffsValue)                      OPTIONAL,    -- Need R
betaOffsetCG-UCI-r16                   INTEGER (1..ffsValue)                      OPTIONAL,    -- Need R
cg-COT-SharingList-r16                 SEQUENCE (SIZE (1..ffsValue)) OF CG-COT-Sharing-r16   OPTIONAL,   -- Need R
harq-ProcID-Offset-r16                 INTEGER (0..15)                            OPTIONAL,    -- Need M
harq-ProcID-Offset2-r16                INTEGER (0..15)                            OPTIONAL,    -- Need M
configuredGrantConfigIndex-r16         ConfiguredGrantConfigIndex-r16             OPTIONAL,    -- Need M
configuredGrantConfigIndexMAC-r16      ConfiguredGrantConfigIndexMAC-r16          OPTIONAL,    -- Need M
periodicityExt-r16                     INTEGER (1..5120)                          OPTIONAL,    -- Need M
startingFromRV0-r16                    ENUMERATED {on, off}                       OPTIONAL,    -- Need M
phy-PriorityIndex-r16                  ENUMERATED {p0, p1}                         OPTIONAL,    -- Need M
autonomousReTx-r16                     ENUMERATED {enabled}                       OPTIONAL     -- Cond LCH-BasedPrioritization
]]
}
```

*FIG. 7B*

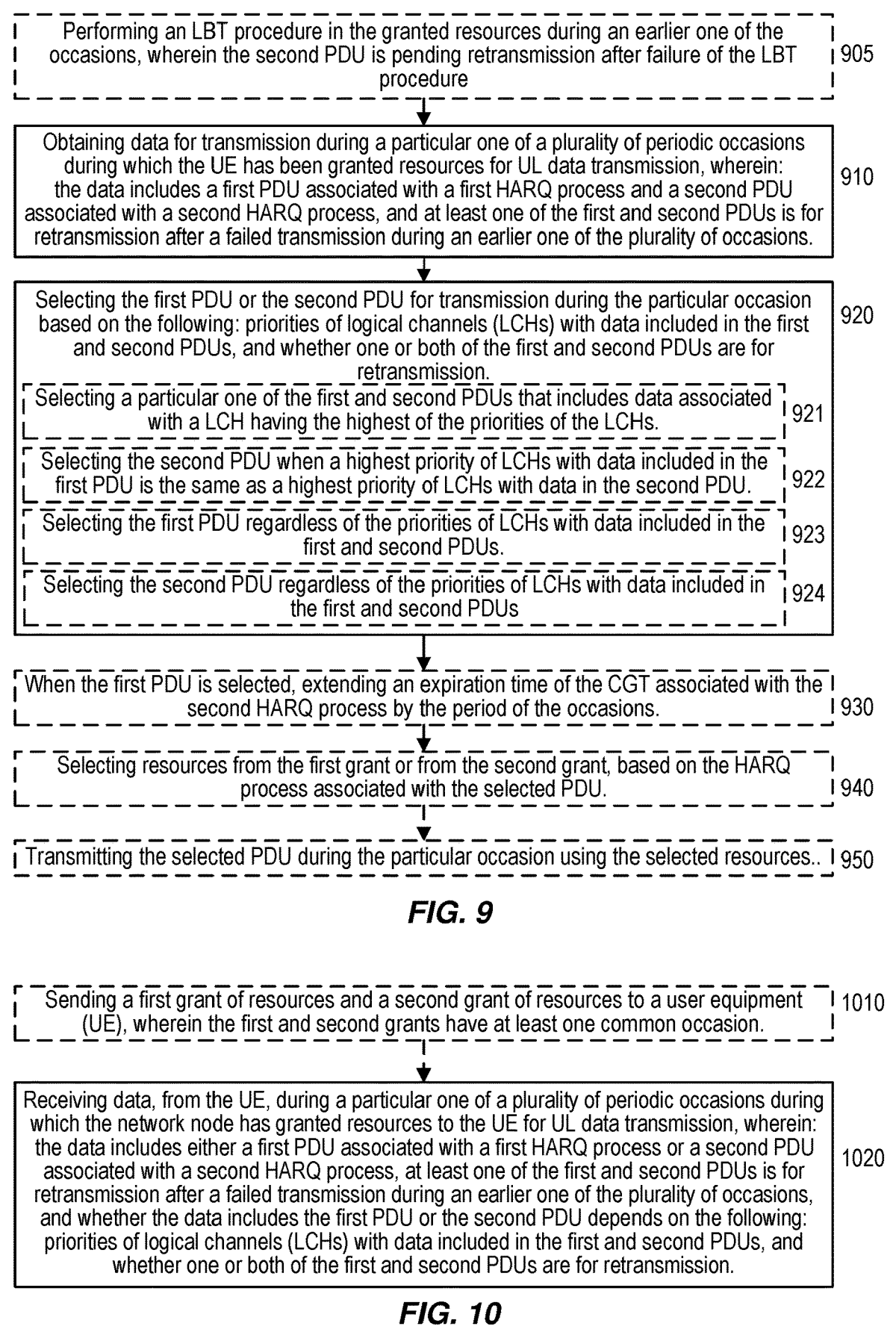

Performing an LBT procedure in the granted resources during an earlier one of the occasions, wherein the second PDU is pending retransmission after failure of the LBT procedure    905

Obtaining data for transmission during a particular one of a plurality of periodic occasions during which the UE has been granted resources for UL data transmission, wherein: the data includes a first PDU associated with a first HARQ process and a second PDU associated with a second HARQ process, and at least one of the first and second PDUs is for retransmission after a failed transmission during an earlier one of the plurality of occasions.    910

Selecting the first PDU or the second PDU for transmission during the particular occasion based on the following: priorities of logical channels (LCHs) with data included in the first and second PDUs, and whether one or both of the first and second PDUs are for retransmission.    920

Selecting a particular one of the first and second PDUs that includes data associated with a LCH having the highest of the priorities of the LCHs.    921

Selecting the second PDU when a highest priority of LCHs with data included in the first PDU is the same as a highest priority of LCHs with data in the second PDU.    922

Selecting the first PDU regardless of the priorities of LCHs with data included in the first and second PDUs.    923

Selecting the second PDU regardless of the priorities of LCHs with data included in the first and second PDUs    924

When the first PDU is selected, extending an expiration time of the CGT associated with the second HARQ process by the period of the occasions.    930

Selecting resources from the first grant or from the second grant, based on the HARQ process associated with the selected PDU.    940

Transmitting the selected PDU during the particular occasion using the selected resources..    950

FIG. 9

Sending a first grant of resources and a second grant of resources to a user equipment (UE), wherein the first and second grants have at least one common occasion.    1010

Receiving data, from the UE, during a particular one of a plurality of periodic occasions during which the network node has granted resources to the UE for UL data transmission, wherein: the data includes either a first PDU associated with a first HARQ process or a second PDU associated with a second HARQ process, at least one of the first and second PDUs is for retransmission after a failed transmission during an earlier one of the plurality of occasions, and whether the data includes the first PDU or the second PDU depends on the following: priorities of logical channels (LCHs) with data included in the first and second PDUs, and whether one or both of the first and second PDUs are for retransmission.    1020

FIG. 10

LOGICAL CHANNEL PRIORITIZATION WITHIN CONFIGURED GRANTS

TECHNICAL FIELD

The present invention generally relates to wireless communication networks, and more specifically to techniques for prioritization between multiple types (or channels) of data that are available for transmission by a user equipment (UE) during one of a plurality of occasions in which the UE has been granted transmission resources by a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR was initially specified in 3GPP Release 15 (Rel-15) and continues to evolve through subsequent releases, such as Rel-16 and Rel-17.

5G/NR technology shares many similarities with fourth-generation Long-Term Evolution (LTE). For example, NR uses CP-OFDM (Cyclic Prefix Orthogonal Frequency Division Multiplexing) in the downlink (DL) from network to user equipment (UE), and both CP-OFDM and DFT-spread OFDM (DFT-S-OFDM) in the uplink (UL) from UE to network. As another example, NR DL and UL time-domain physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

FIG. 1 shows an exemplary configuration of NR user plane (UP) and control plane (CP) protocol stacks between a UE, a gNodeB (gNB, e.g., base station), and an access and mobility management function (AMF) in the 5G core network (5GC). Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for CP and UP.

PDCP provides header compression and retransmission for UP data. On the UP side, Internet protocol (IP) packets arrive to the PDCP layer as service data units (SDUs), and PDCP creates protocol data units (PDUs) to deliver to RLC. In addition, the Service Data Adaptation Protocol (SDAP) layer handles quality-of-service (QOS) including mapping between QoS flows and Data Radio Bearers (DRBs) and marking QoS flow identifiers (QFI) in UL and DL packets.

When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and establishes, configures, maintains, and releases DRBs and Signaling Radio Bearers (SRBs) used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on physical DL control channel (PDCCH) for pages from 5GC via gNB. A UE in RRC_IDLE state is not known to the gNB serving the cell where the UE is camping. However, NR RRC includes an RRC INACTIVE state in which a UE is known (e.g., via context) by the serving gNB.

In NR, UL and DL data transmissions take place on physical UL shared channel (PUSCH) and physical DL shared channel (PDSCH), respectively. These data transmissions can take place with or without an explicit grant or assignment of resources by the network (e.g., gNB). In general, UL transmissions are usually referred to as being "granted" by the network (i.e., "UL grant"), while DL transmissions are usually referred to as being "assigned" by the network (i.e., "DL assignment"). For a transmission based on an explicit grant/assignment, the gNB sends DL control information (DCI) to a UE informing it of specific resources to be used for the transmission. The gNB scheduler issues the grant/assignment based on knowledge of DL data in the gNB buffer or UL data in the UE buffer, which the UE reports via buffer status report (BSR) and/or a one-bit scheduling request (SR).

In contrast, a transmission without an explicit grant/assignment is typically configured to occur during occasions with a defined periodicity. Given a periodic and/or recurring UL grant and/or DL assignment, the UE can then initiate a data transmission and/or receive data according to a predefined configuration. Such transmissions can be referred to as semi-persistent scheduling (SPS, for DL), configured grant (CG, for UL), or grant-free transmissions.

For NR UL, there are two types of CGs. Type-1 are configured via RRC signaling only, while for Type-2, some parameters are preconfigured via RRC signaling and some PHY parameters are dynamically indicated. The RRC configuration of a UL configured grant includes various parameters, including a configuredGrantTimer (CGT) value used for controlling operation of hybrid ARQ (HARQ) processes in the UL via a timer in the UE.

A related feature is Autonomous Uplink (AUL), which is intended to support autonomous HARQ retransmissions (i.e., of the same transport block, TB) using an UL configured grant. At each transmission of a HARQ process TB during a CG occasion, the UE starts a CG Retransmission Timer (CGRT) and if the gNB does not positively acknowledge reception of the TB before expiration of the CGRT, the TB is autonomously retransmitted during a subsequent CG occasion.

SUMMARY

During some CG occasions, a HARQ process having data available for retransmission may have to contend with other HARQ processes that also have data available for transmission or retransmission. It is currently unclear how a UE should prioritize these multiple HARQ processes contending for a single CG occasion.

Embodiments of the present disclosure provide specific improvements to communication between UEs and a wireless network (e.g., radio access network, RAN), such as by providing, enabling, and/or facilitating solutions to overcome exemplary problems summarized above and described in more detail below.

Embodiments include methods (e.g., procedures) for a UE configured to operate in RAN. These exemplary methods can include obtaining data for transmission during a particular one of a plurality of periodic occasions during which the UE has been granted resources for UL data transmission. The data includes a first protocol data unit (PDU) associated with a first HARQ process and a second PDU associated with a second HARQ process. At least one of the first and second PDUs is for retransmission after a failed transmission during an earlier one of the plurality of occasions. These exemplary methods can also include selecting the first PDU or the second PDU for transmission during the particular occasion based on at least one of the following: priorities of logical channels (LCHs) with data included in the first and second PDUs, and whether one or both of the first and second PDUs are for retransmission.

In some embodiments, the first PDU is for initial transmission and the second PDU is for retransmission, and selecting the first PDU or the second PDU includes selecting a particular one of the first and second PDUs that includes data associated with a LCH having the highest of the priorities of the LCHs.

In some embodiments, the first PDU is for initial transmission and the second PDU is for retransmission, and selecting the first PDU or the second PDU includes selecting the second PDU when a highest priority of LCHs with data included in the first PDU is the same as a highest priority of LCHs with data included in the second PDU.

In some of these embodiments, LCHs having one or more first types of MAC CEs included in the second PDU are given higher priority than LCHs having data included in the first PDU. In a variation, this higher priority can be given only when the second PDU is for retransmission after one or more failed retransmissions during one or more earlier occasions. In some of these embodiments, the first types of MAC CEs are associated with different priorities.

In some of these embodiments, a configured grant timer (CGT) and a configured grant retransmission timer (CGRT) associated with the first HARQ process are not running, and the first HARQ process is not pending. Additionally, a CGRT associated with the second HARQ process is not running, and either the second HARQ process is pending or a CGT associated with the second HARQ process is running.

In some of these embodiments, these exemplary methods can also include, when the first PDU is selected, extending an expiration time of the CGT associated with the second HARQ process by the period of the occasions. In some embodiments, extending the expiration time is based on one of the following: that the CGT associated with the second HARQ process is running, or that the second HARQ process is pending.

In other embodiments, the first and second PDUs are for retransmission, and selecting the first PDU or the second PDU includes one of the following:

select the first PDU regardless of the priorities of LCHs with data included in the first and second PDUs; or selecting the second PDU regardless of the priorities of LCHs with data included in the first and second PDUs.

In some of these embodiments, a CGT associated with the first HARQ process is running, a CGRT associated with the first HARQ process has expired, and the first HARQ process is not pending. Additionally, a CGRT and a CGT associated with the second HARQ process are not running, and the second HARQ process is pending.

In some of these embodiments, these exemplary methods can also include performing a listen-before-talk (LBT) procedure in the granted resources during an earlier one of the occasions, where the second PDU is pending retransmission after failure of the LBT procedure.

In some embodiments, the particular occasion can be one of a first plurality of occasions associated with a first grant of resources and one of a second plurality of occasions associated with a second grant of resources. In such embodiments, these exemplary methods can also include the following: selecting resources from the first grant or from the second grant, based on the HARQ process associated with the selected PDU; and transmitting the selected PDU during the particular occasion using the selected resources.

Other embodiments include exemplary methods (e.g., procedures) for network node in a RAN. In general, these exemplary methods can be complementary to the exemplary UE methods summarized above.

These exemplary methods can include receiving data, from a UE, during a particular one of a plurality of periodic occasions during which the network node has granted resources to the UE for UL data transmission. The data includes either a first PDU associated with a first HARQ process or a second PDU associated with a second HARQ process. At least one of the first and second PDUs is for retransmission after a failed transmission during an earlier one of the plurality of occasions. Whether the data includes the first PDU or the second PDU depends on priorities of LCHs with data included in the first and second PDUs and/or whether one or both of the first and second PDUs are for retransmission.

In some embodiments, the first PDU is for initial transmission and the second PDU is for retransmission, and the data includes a particular one of the first and second PDUs that includes data associated with a LCH having the highest of the priorities of the LCHs. In some embodiments, the first PDU is for initial transmission and the second PDU is for retransmission, and the data includes the second PDU when a highest priority of LCHs with data included in the first PDU is the same as a highest priority of LCHs with data included in the second PDU.

In some of these embodiments, LCHs having one or more first types of MAC CEs included in the second PDU are given higher priority than LCHs having data included in first PDU. In a variation, this higher priority can be given only when the second PDU is for retransmission after one or more failed retransmissions during one or more earlier occasions. In some of these embodiments, the first types of MAC CEs are associated with different priorities.

In some of these embodiments, a CGT and a CGRT associated with the first HARQ process are not running in the UE, and the first HARQ process is not pending in the UE. Additionally, a CGRT associated with the second HARQ process is not running in the UE, and either the second HARQ process is pending in the UE or a CGT associated with the second HARQ process is running in the UE.

In other embodiments, the first and second PDUs are for retransmissions and one of the following applies:

the data includes the first PDU regardless of the priorities of LCHs with data included in the first and second PDUs; or
   the data includes the second PDU regardless of the priorities of LCHs with data included in the first and second PDUs.

In some of these embodiments, a CGT associated with the first HARQ process is running in the UE, a CGRT associated with the first HARQ process has expired in the UE, and the first HARQ process is not pending in the UE. Additionally, a CGRT and a CGT associated with the second HARQ process are not running in the UE, and the second HARQ process is pending in the UE. In some of these embodiments, the second PDU is pending retransmission after a failed LBT procedure by the UE in the granted resources during an earlier one of the occasions.

In some embodiments, the particular occasion can be one of a first plurality of occasions associated with a first grant of resources and one of a second plurality of occasions associated with a second grant of resources. In other words, the first and second grants have at least one common occasion, i.e., the particular occasion. In such embodiments, the data is received during the particular occasion on resources from the first grant or from the second grant, depending on the HARQ process associated with the PDU included in the data. In some of these embodiments, these exemplary methods can also include sending the first grant and the second grant to the UE.

Other embodiments include UEs (e.g., wireless devices) and RAN nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or RAN nodes to perform operations corresponding to any of the exemplary methods described herein.

Embodiments described herein provide flexible and efficient techniques for LCH-based prioritization during a single UL CG occasion, as well as for handling of de-prioritized HARQ processes. These techniques can provide various benefits and/or advantages, including allowing a UE to fulfill requirements for higher-priority URLLC-type UL traffic while at the same time providing high capacity when multiplexing with lower-priority eMBB-type UL traffic.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes FIGS. 7A-B, shows an exemplary ASN.1 data structure for a ConfiguredGrantConfig information element (IE).

FIG. 9 shows a flow diagram of an exemplary method for a UE (e.g., wireless device), according to various exemplary embodiments of the present disclosure.

FIG. 10 shows a flow diagram of an exemplary method for a network node (e.g., base station, eNB, gNB, ng-eNB, etc.), according to various exemplary embodiments of the present disclosure.

DETAILED DESCRIPTION

Figure 1:
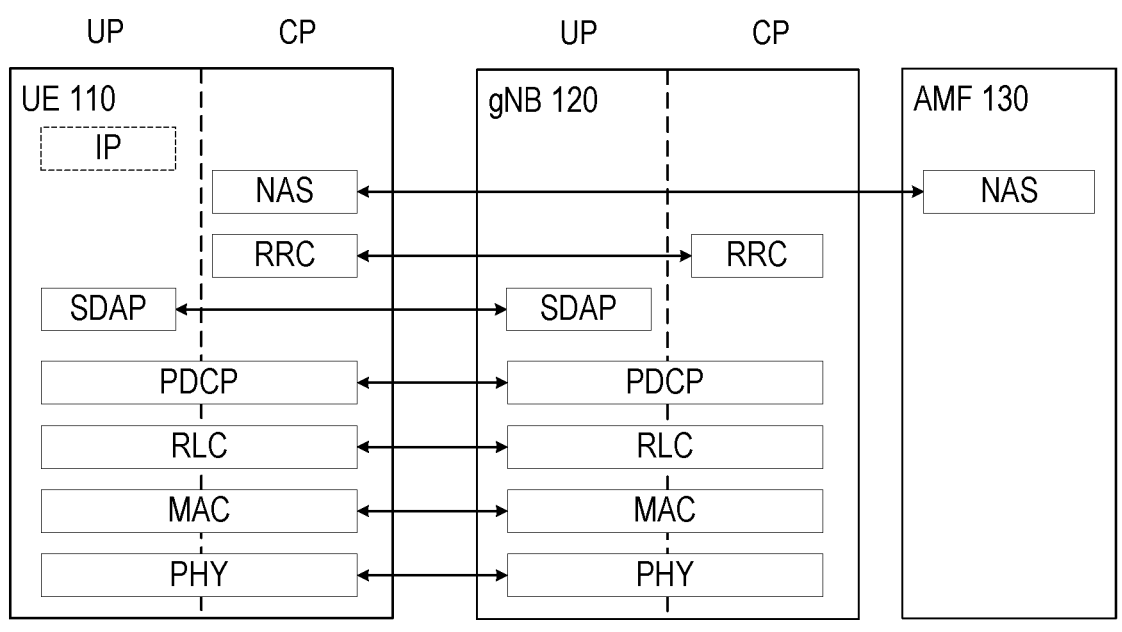
FIG. 1 shows exemplary NR user plane (UP) and control plane (CP) protocol stacks.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IOT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, for NR UEs that support UL configured grants (CGs) and autonomous uplink (AUL), there may be some CG occasions during which a particular HARQ process has data available for retransmission while one or more other HARQ processes also have data available for transmission or retransmission, as the case may be. It is currently unclear how a UE is should prioritize among these multiple HARQ processes for a single CG occasion. This is discussed in more detail below, after an introduction to NR network architecture and PHY characteristics.

Figure 2:
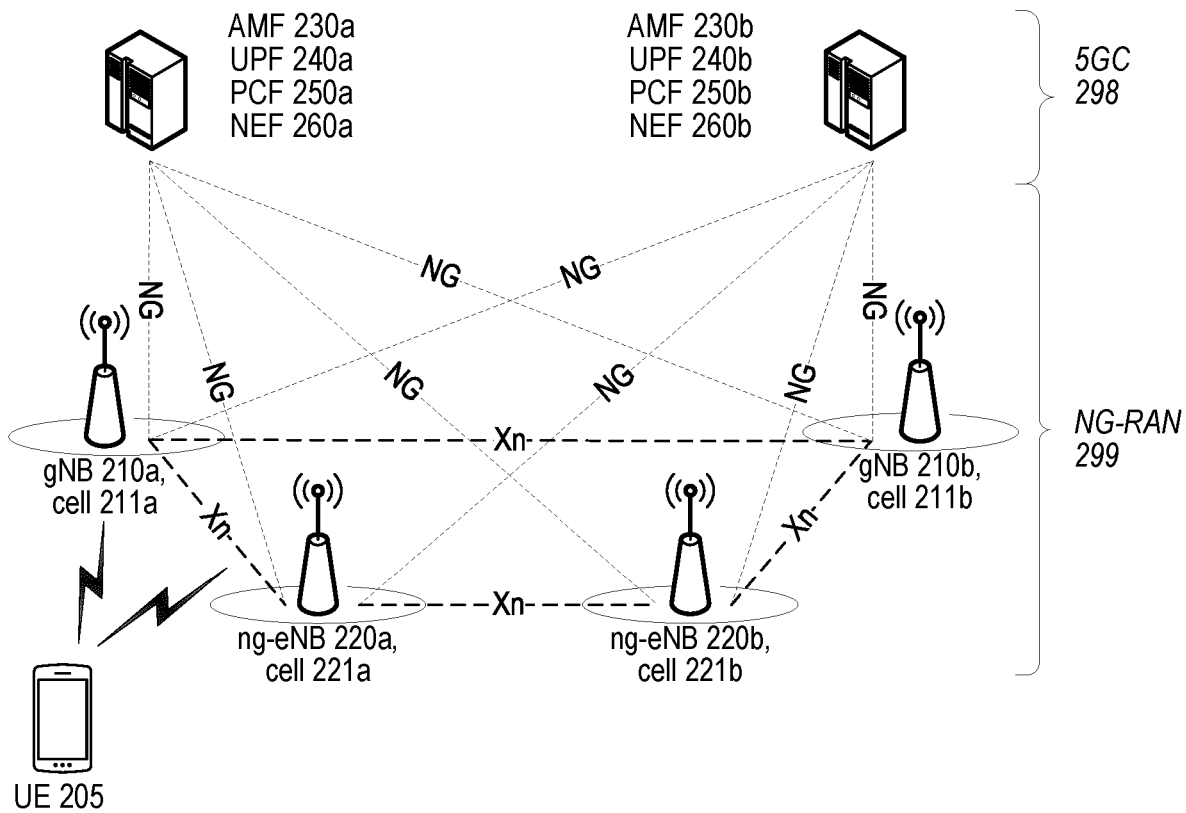
FIG. 2 illustrates a high-level views of an exemplary 5G/NR network architecture.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a,b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b).

Each of the gNBs 210 can support the NR radio interface including frequency division duplexing (FDD), time division duplexing (TDD), or a combination thereof. In contrast, each of ng-eNBs 220 can support the LTE radio interface but, unlike conventional LTE eNodeBs (eNBs), connect to the 5GC via the NG interface. Each of the gNBs and ng-eNBs can serve a geographic coverage area including one more cells, including cells 211a-b and 221a-b shown as exemplary in FIG. 2. The gNBs and ng-eNBs can also use various directional beams to provide coverage in the respective cells. Depending on the particular cell in which it is located, a UE 205 can communicate with the gNB or ng-eNB serving that cell via the NR or LTE radio interface, respectively.

The gNBs shown in FIG. 2 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU.

NR DL and UL physical resources are organized into equal-sized 1-ms subframes. A subframe is further divided into multiple slots of equal duration, with each slot including multiple OFDM-based symbols. An NR slot can include 14 OFDM symbols for normal cyclic prefix and 12 symbols for extended cyclic prefix. A resource block (RB) consists of a active at a given time. If a UE is configured with a supplementary UL, the UE can be configured with up to four additional BWPs in the supplementary UL carrier bandwidth, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

Figure 3:
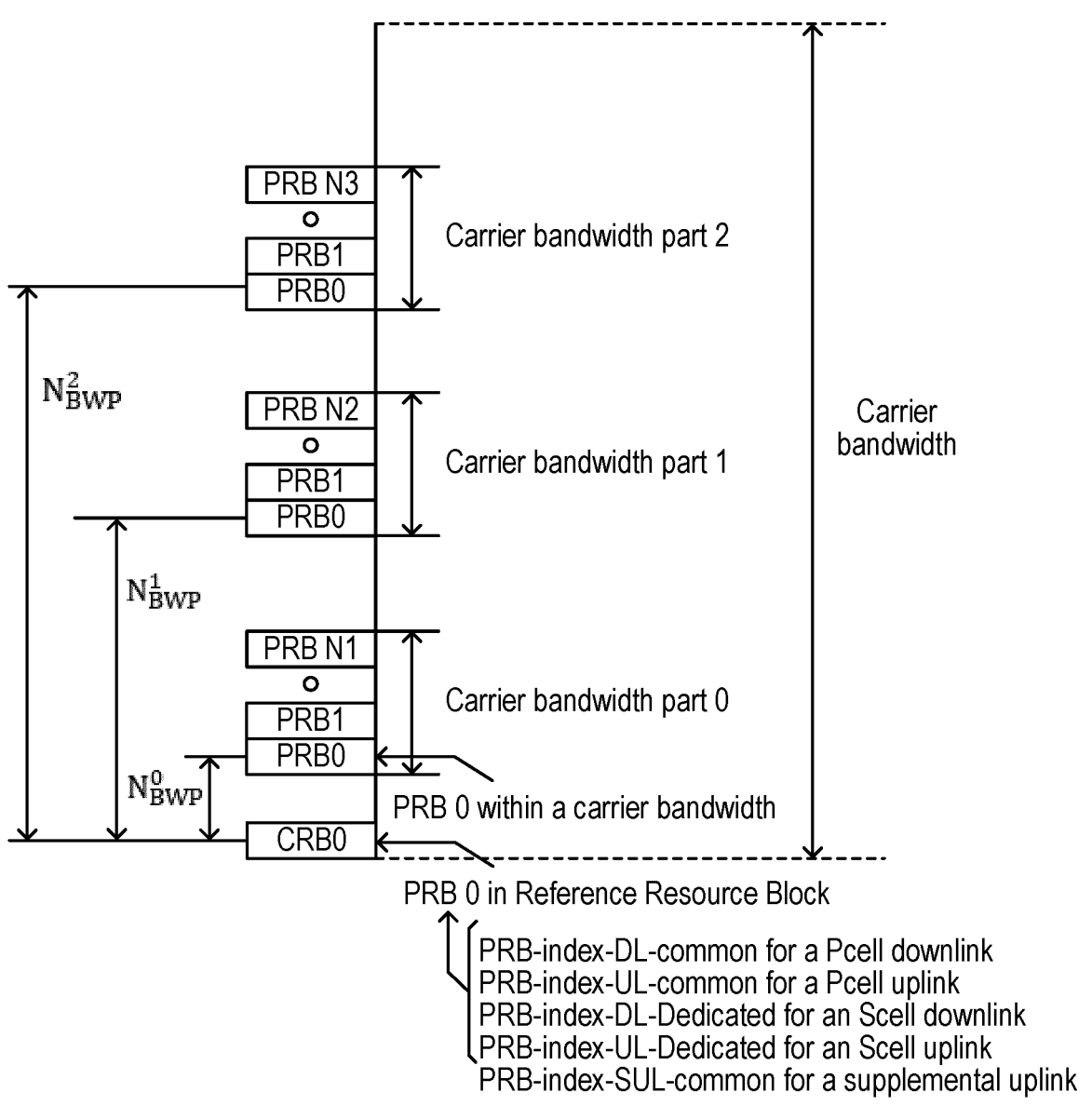
FIG. 3 shows an exemplary NR user equipment (UE) frequency-domain configuration.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $$N_{BWPi,}^{size} - 1,$$

where i is the index of the particular BWP for the carrier. For example, as shown in FIG. 3, BWP0 includes PRBs 0 to N1, BWP1 includes PRBs 0 to N2, and BWP2 includes PRBs 0 to N3.

NR supports various SCS values $\Delta f=(15 \times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu 50$ MHz. Table 1 below summarizes currently-supported NR numerologies and associated parameters. Different DL and UL numerologies can be configured by the network.

TABLE 1

| μ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHZ |
| 4 | 240 | Normal | 0.29 μs | 4.17 μs | 4.46 μs | 62.5 μs | 800 MHZ | group of 12 contiguous OFDM subcarriers for a duration of a 12- or 14-symbol slot. A resource element (RE) corresponds to one OFDM subcarrier during one OFDM symbol interval.

Figure 4:
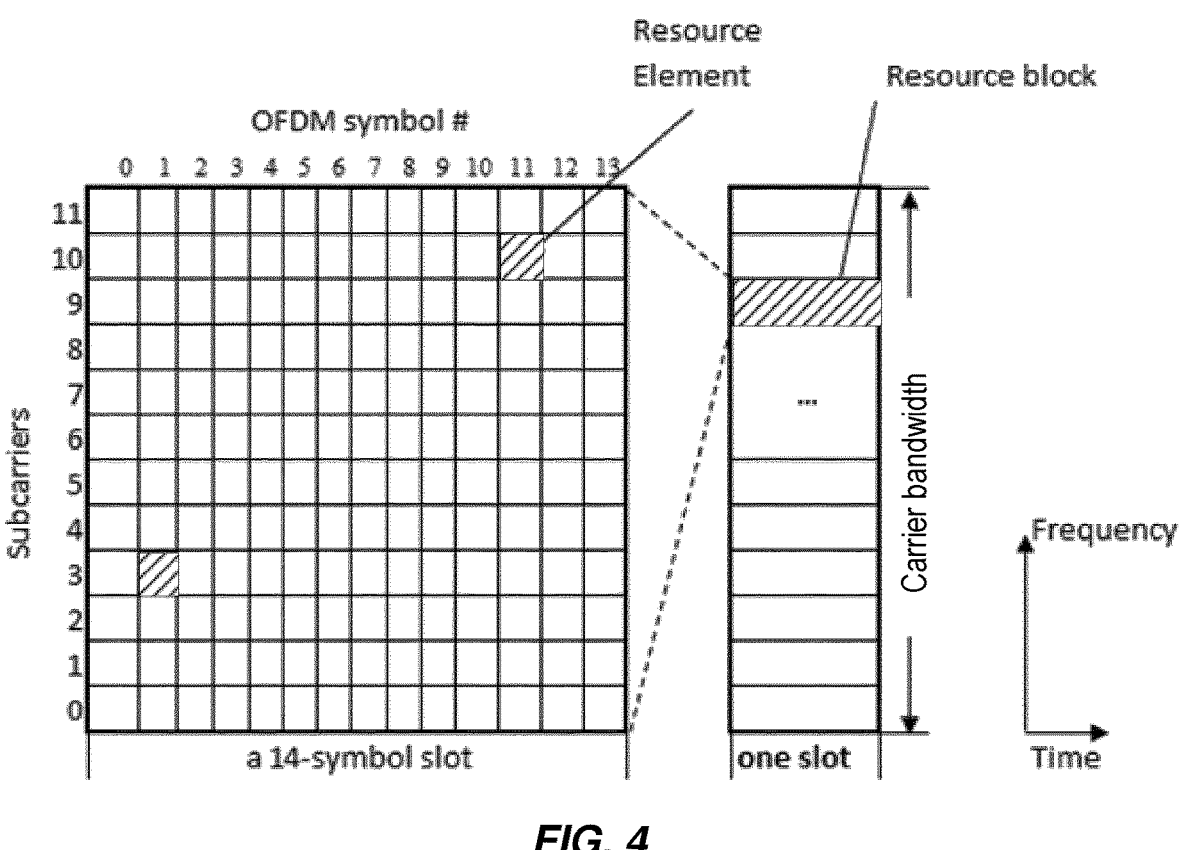
FIG. 4 shows an exemplary time-frequency resource grid for an NR slot.

FIG. 3 shows an exemplary frequency-domain configuration for an NR UE. In Rel-15 NR, a UE can be configured with up to four carrier bandwidth parts (BWPs) in a DL carrier bandwidth with a single DL BWP being active at a given time. A UE can be configured with up to four BWPs in an UL carrier bandwidth with a single UL BWP being FIG. 4 shows an exemplary time-frequency resource grid for an NR slot within a carrier bandwidth. As illustrated in FIG. 4, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix (e.g., as shown in FIG. 4) and 12 symbols for extended cyclic prefix.

Figure 5:
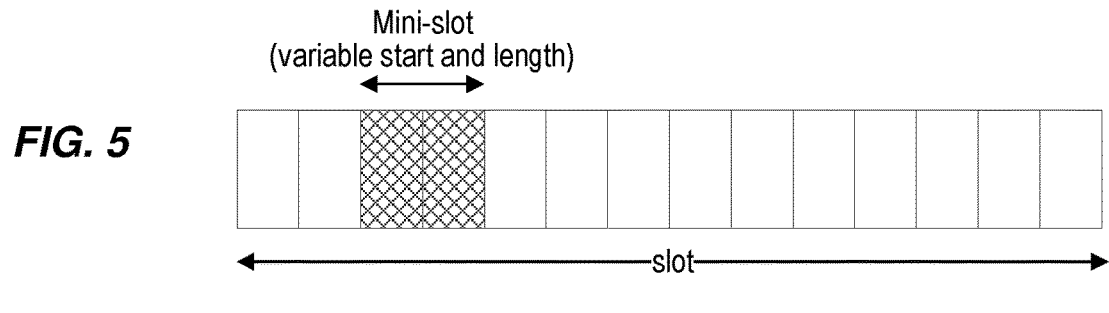
FIG. 5 shows an exemplary mini-slot arrangement for NR.

In addition, NR includes Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 5 shows an exemplary mini-slot arrangement in which the mini-slot begins in the third symbol of the slot and is two symbols in duration. Mini-slots can be used for unlicensed spectrum and latency-critical transmissions (e.g., URLLC). However, mini-slots are not service-specific and can also be used for eMBB or other services.

An NR slot can also be arranged with various time-division duplexing (TDD) arrangements of UL and DL symbols. These TDD arrangements include:

DL-only (i.e., no UL transmission) slot with transmission late-start in symbol 1;

DL-heavy, with one UL symbol and guard periods before and after the UL symbol to facilitate change of transmission direction;

UL-heavy, with a single UL symbol that can carry DL control information; and

UL-only with transmission on-time start in symbol 0 and the initial UL symbol usable to carry DL control information.

Figure 6:
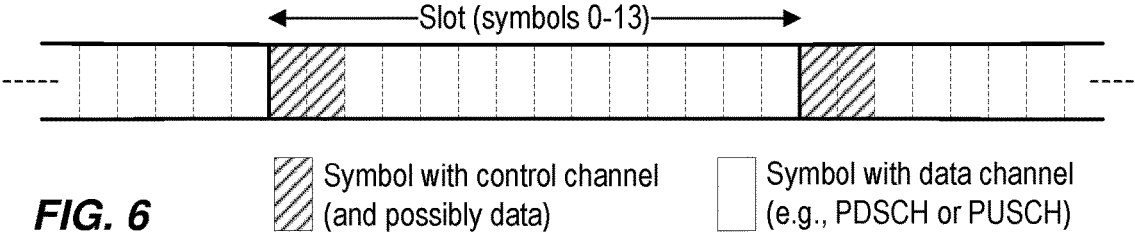
FIG. 6 shows an exemplary arrangement of control and data channels within an NR slot.

FIG. 6 shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain. The frequency bandwidth of the CORESET is variable. CORESET resources can be indicated to a UE by RRC signaling. The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. To assist a UE with channel estimation, multiple REGs can be grouped together to form a REG bundle, and the REG bundle size (i.e., 2, 3, or 5 REGs) can be indicated to the UE. The UE can assume that any precoder used for transmission of PDCCH is the same over an entire REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

As mentioned above, NR data scheduling can be performed dynamically, e.g., on a per-slot basis. In each slot, the gNB transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 (v15.0.0) clause 5.1.3.1. Subsequently, the UE reads the redundancy version field (rv) in the DCI to determine the redundancy version. Based on this information, the number of layers (v), and the total number of allocated PRBs before rate matching ($n_{PRB}$), the UE determines the Transport Block Size (TBS) for the PDSCH according to the procedure defined in 3GPP TS 38.214 (v15.0.0) clause 5.1.3.2.

In summary, dynamic scheduling provides a single grant or assignment of resources (i.e., via DCI) to individual devices for an upcoming transmit time interval (TTI, e.g., slot). The grant or assignment tells UEs when and what transport format to use for an upcoming data transmission.

The scheduler issues UL resource grants based on knowledge of data stored in UE buffers via buffer status reports (BSRs). UEs may send BSRs using already-granted UL resources, or may send a one-bit scheduling request (SR) on PUCCH shared resources to request a grant of UL resources for BSR. The gNB may grant UL resources in response to the SR and may grant additional UL resources in response to the BSR. However, this process requires exchanging four messages and has two possible delays between request and grant. As such, dynamic scheduling is inadequate for services involving small but frequent delay-sensitive data transmissions, such as online game, ping, etc.

Prescheduling addresses these inadequacies by sending a (predictive) predefined grant of UL resources to a UE without knowledge of the UE's actual buffer status. If the size is sufficient, the UE may the granted resources to transmit buffered UL data. Otherwise, the UE can use the granted resources to report buffer status, from which the UE can receive a dynamic UL grant to transmit the buffered UL data. In case the UE has no UL data buffered at the time of predefined grant, it can refrain from using the granted resources.

The basic idea behind UL CG is to configure a (predictive) predefined grant to a UE, which may use it when data arrives at the UE's buffer and no dynamic UL grant is available. Since the UE does not have to request UL resources when data arrives, a CG can be suitable for applications requiring low latency.

Two important parameters for configured (or predictive) grants are period and data size. Period refers to how often granted resources are available and data size refers to how much data can be carried by each of the periodically-granted resources. Configuration of these two parameters is usually a tradeoff between latency and resource utilization. Too large data size consumes resources very quickly as the number of UEs increases, but too small data size can cause segmentation of UE data (e.g., over multiple periods) and thus longer latency. In practice, configured grants should be conservative, with reasonably small data size targeted to allow BSR or single ping packet transmission.

Different types of delay-sensitive services may have a range of traffic behavior, and it is desirable to adapt pre-scheduled resources according to service type. One approach is dynamic TDD, in which the scheduler dynamically changes transmission direction in slots according to traffic needs. In contrast to TDD patterns where UL and DL slots are static, the time duration in between two neighboring UL slots in dynamic TDD can vary from frame to frame. Periodic scheduling via configured grant must take this variation into account when setting grant parameters.

NR supports two types of pre-configured UL resources, both of which are similar to LTE semi-persistent scheduling (SPS) with some enhancements such as support for transport block (TB) repetitions. In type 1, UL data transmission with configured grant is based only on RRC configuration without any L1 signaling. Type 2 is similar to the LTE SPS feature, where some parameters are preconfigured via RRC and some physical layer parameters are configured via MAC scheduling. L1 signaling is used for activation/deactivation of a type-2 grant. For example, a gNB explicitly activates the configured resources on PDCCH and the UE confirms reception of the activation/deactivation grant using a MAC control element.

FIG. 7, which includes FIGS. 7A-B, shows an exemplary ASN.1 data structure for a ConfiguredGrantConfig information element (IE) used for RRC configuration of NR type-1 and type-2 UL configured grants. The IE shown in FIG. 7A includes an srs-ResourceIndicator field that points to one of the UL sounding reference signal (SRS) resources in an SRS resource configuration provided by the network via RRC signaling. The SRS resource can also be configured with a spatial relation to a DL RS (e.g., SSB or CSI-RS) or another UL SRS resource. In other words, the UE should transmit PUSCH based on the UL configured grant using the same precoder or beamforming weights as used for the transmission of the SRS identified by the srs-ResourceIndicator field and the SRS resource configuration.

For both types, UL periodicity is configured via the periodicity field in FIG. 7. Table 2 below summarizes periodicities (in symbols) supported for various subcarrier spacing (SCS).

TABLE 2

| SCS (kHz) | Periodicity (symbols) | n (slots) |
|---|---|---|
| 15 | 2, 7, n*14 | 1, 2, 4, 5, 8, 10, 16, 20, 32, 40, 64, 80, 128, 160, 320, 640 |
| 30 | 2, 7, n*14 | 1, 2, 4, 5, 8, 10, 16, 20, 32, 40, 64, 80, 128, 160, 256, 320, 640, 1280 |
| 60 (normal CP) | 2, 7, n*14 | 1, 2, 4, 5, 8, 10, 16, 20, 32, 40, 64, 80, 128, 160, 256, 320, 512, 640, 1280, 2560 |
| 60 (extended CP) | 2, 6, n*12 | 1, 2, 4, 5, 8, 10, 16, 20, 32, 40, 64, 80, 128, 160, 256, 320, 512, 640, 1280, 2560 |
| 120 | 2, 7, n*14 | 1, 2, 4, 5, 8, 10, 16, 20, 32, 40, 64, 80, 128, 160, 256, 320, 512, 640, 1024, 1280, 2560, 5120 |

Additionally, a periodicityExt parameter was introduced to support finer granularities than periodicity, and is defined in 3GPP TS 38.331 v.16.2.0 as follows:

TABLE 3

| SCS (kHz) | Periodicity (symbols) | periodicityExt |
|---|---|---|
| 15 | periodictyExt*14 | 1-640 |
| 30 | periodictyExt*14 | 1-1280 |
| 60 (normal CP) | periodictyExt*14 | 1-2560 |
| 60 (extended CP) | periodictyExt*12 | 1-2560 |
| 120 | periodictyExt*14 | 1-5120 |

For Type 1 configured grants, time resources are configured via RRC signalling:

timeDomainAllocation: index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

timeDomainOffset: Offset of a resource with respect to SFN=0 in time domain.

For Type2 configured grants, the periodicity is configured by RRC in the same way as for Type1, but the slot offset is dynamically indicated by the slot in which the UE receives the DCI that activates the Type2 configured grant. In contrast to Type1, the time domain allocation of PUSCH is indicated dynamically by DCI via the time domain resource assignment field (i.e., slot/length indicator value, SLIV) in the same way as for scheduled (non-CG) PUSCH.

A configuredGrantTimer (CGT) is used to prevent an UL CG from overriding and/or pre-empting a TB scheduled with a dynamic grant (i.e., new transmission or retransmission), or an initial TB with another UL CG (i.e., new transmission). However, there is no explicit HARQ ACK/NACK in Rel-15. Rather, the gNB implicitly indicates an ACK by providing an UL grant for a new transmission.

Expiration of the CGT indicates an ACK for a HARQ process associated with the UL CG. The CGT is (re)started for an associated HARQ process upon PUSCH transmission based on a dynamic grant (i.e., new transmission or retransmission) or a configured grant (i.e., new transmission). The CGT is stopped when the UE has received a PDCCH indicating configured grant Type 2 activation, or upon an implicit ACK for the associated HARQ process (i.e., a grant for a new transmission).

In NR Rel-15, only an initial transmission of a TB is allowed to use either type of an UL CG. In other words, any HARQ retransmissions of a TB must rely on dynamic UL grant, which is indicated via PDCCH addressed to the UE's configured scheduling RNTI (CS-RNTI). NR Rel-16 introduced autonomous uplink (AUL), which supports autonomous HARQ retransmission using a CG. In this arrangement, a new UE timer (referred to as "CG retransmission timer" or CGRT for short) is used to protect the HARQ procedure so that the retransmission can use the same HARQ process for both transmission and retransmission of a transport block (TB) of UL data. CGRT is configured by the parameter cg-RetransmissionTimer shown in FIG. 7. The CGRT is started for a HARQ process configured with AUL upon the data transmission using a configured grant, and a retransmission using another configured grant is triggered when the CGRT expires.

This functionality helps the UE to avoid a HARQ process being stalled in case a gNB has missed the HARQ transmission initiated by UE. However, an observed issue is that a UE may just repetitively initiate autonomous HARQ retransmissions for a HARQ process for a long duration, but the gNB may not successfully receive the transmissions, e.g., due to bad radio channel quality or repetitive listen-before-talk (LBT) failures in case of a shared channel. This is undesirable since the data in the TB may no longer be useful and further retransmission attempts would unnecessarily congest the channel and affect the latency of other packets in the UL buffer.

The UE may eventually trigger RLC-layer retransmission for an RLC PDU that is undergoing HARQ retransmissions. However, the retransmitted RLC PDU would occupy a different HARQ process, such that the UE would then maintain two HARQ processes in transmission for the same RLC PDU and the gNB's RLC receiver may receive duplicate RLC PDUs. This may create problems with wraparound of RLC sequence number. In addition, the second received RLC PDU may be treated as new data and passed to upper layers rather than being dropped as a duplicate.

Therefore, it is necessary to introduce a limit on UE-triggered AUL retransmissions for a HARQ process. To address this issue, the existing CGT is configured to indicate the maximum amount of time for the UE to complete transmission of an HARQ process. When the CGT expires, the UE should flush the HARQ buffer for this HARQ process and transmit new data associated with it. If both CGT and CGRT are configured for a HARQ process, both timers can be operated in parallel. In this way, the UE can perform HARQ retransmission using CG resources for a HARQ process while CGT is running for the process. The value used for CGT should be longer than the value used for CGRT.

Figure 8:
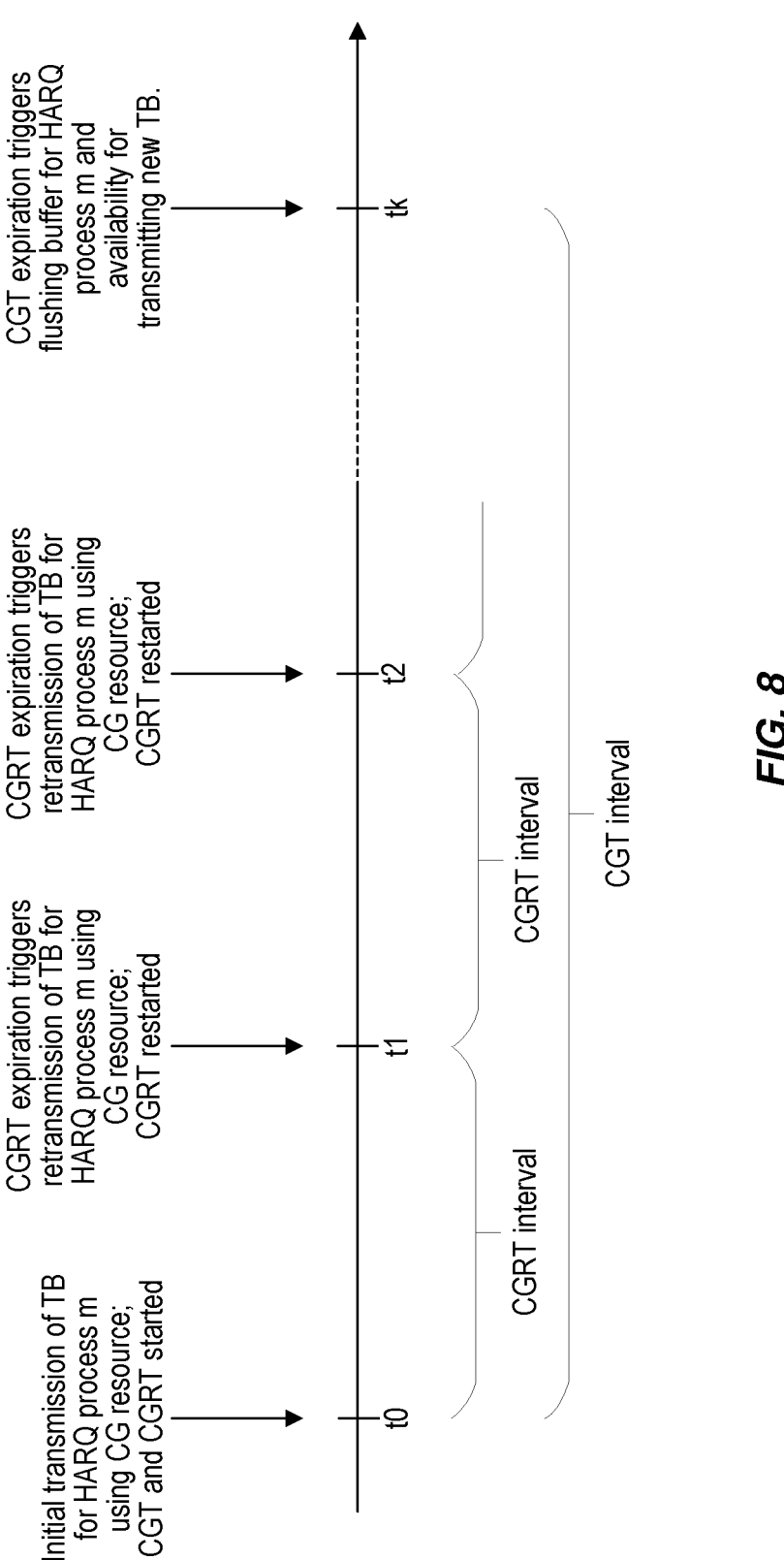
FIG. 8 shows an exemplary procedure for limiting autonomous uplink (AUL) transmissions for a hybrid ARQ (HARQ) process.

An example of the above-described procedure is illustrated in FIG. 8. An initial transmission of a TB for HARQ process m occurs at t0 using a CG resource, causing the UE to start CGT and CGRT. The CGRT interval expires at t1 while the CGT is still running, causing the UE to retransmit the TB for HARQ process m using the CG resource and restart the CGRT. The same process occurs at t2. The CGT interval expires at a subsequent time tk, causing the UE to flush the TB from the buffer for HARQ process m and make this HARQ process available for transmitting a new TB.

A UE can be provided with multiple active UL CGs for the UE's active bandwidth part (BWP) in the UE's serving cell. The availability of multiple CGs can, for example, enhance reliability and reduce latency for critical services. In addition, NR operation in unlicensed spectrum (e.g., NR-U), multiple CGs are under consideration as a means for allowing a UE to switch to slot-based transmissions after initiating the COT (channel occupancy time) to minimize DMRS and UCI overhead.

There can be one or more HARQ processes in the HARQ process pool assigned to each CG configuration. In particular, each CG can be configured with parameters nrofHARQ-Processes and harq-ProcID-Offset (shown in FIG. 7) so that the UE can select a HARQ process ID within [harq-procID-offset, . . . , (harq-procID-offset+nrofHARQ-Processes−1)] for transmission during an occasion of the CG. HARQ processes can also be shared between CG configurations, which can increase flexibility and avoid depletion of limited HARQ process space for the UE. Each CG configuration also includes CGT and CGRT settings (shown in FIG. 7).

A logical channel (LCH) can be mapped to multiple CG configurations, such that the UE can transmit data of the LCH using multiple active CG resources at the same time. If a TB was transmitted using a CG resource, the TB can be retransmitted using the CG resource (among the set of CG resources mapped to the LCH) that comes earliest in the time, which helps to reduce the latency. However, the CG resource selected for retransmission should be the same size as the CG resource used for the initial transmission to avoid the need for rate-matching. In addition, the UE shall use the same HARQ process for transmission and retransmission of a TB.

The CGT timer for a HARQ process shall be started only when the TB using this HARQ process is initially transmitted. The value of the CGT timer is set according to the configuration of the CG resource used for the initial transmission. In parallel, the CGRT shall be (re)started for every transmission/retransmission attempt. For example, if an initial TB transmission uses a resource in CG configuration 1, the CGRT is started using the timer value included in CG configuration 1. If the TB retransmission is performed with the resource in CG configuration 2, the CGRT need to be restarted using the timer value included in CG configuration 2.

The HARQ process number field in an UL DCI (e.g., formats 0_0 and 0_1) scrambled by CS-RNTI is used to indicate which CG configuration is to be activated/deactivated/reactivated and which CG configurations are to be released. In the DCI, NDI in the received HARQ information is 0. Upon reception of an activation/deactivation/reactivation command, the UE sends the gNB a confirmation MAC CE that includes a bitmap in which each bit position corresponds to a particular one of the CG configurations, e.g., the bit position corresponds to the CG index.

A typical NR Industrial Internet of Things (IIoT) device can handle communication for multiple service types, such as periodic URLLC-type robot control messages (also referred to as time sensitive network traffic), URLLC-type of occasional alarm signals (for which periodic resources would need to be configured or relying on UE to send scheduling request for each occasional alarm message), occasional sensor data transmission (may or may not be time-critical), other eMBB best-effort type traffic (e.g., video transmissions or software updates). This traffic mix will be multiplexed for UL transmissions by the UE on multiple LCHs with different priorities. In such a scenario, it is important to treat URLLC-type of traffic with high priority while still maintaining enough capacity to serve other traffic types.

Intra-UE LCH prioritization has been specified in Rel-16. When multiple UL grants overlap (e.g., CG and dynamic grant or multiple CGs), the MAC layer prioritizes LCHs and grants such that, in general, the grant on which the highest-priority data allowed/transmitted is selected. Data to be transmitted on a de-prioritized grant is to be transmitted at the next CG occasion. This is referred to as autonomous transmission.

For unlicensed spectrum access, a separate mechanism for autonomous retransmissions on CG is available introduced. A HARQ process, for which an initial transmission could not take place due to listen before talk (LBT) failure, is considered as "pending". A TB for a pending HARQ process is autonomously retransmitted at the next CG occasion, in a similar manner as a TB for a HARQ process for which CGRT expired without gNB positive acknowledgment. The UE chooses the next HARQ process for transmission itself, and it is mandated that the UE should prioritize retransmissions before transmissions of new data.

The pending/non-pending status is used as an indicator on whether the gNB is potentially aware of an UL transmission. If LBT failure is detected for the first transmission (i.e., initial transmission) after the HARQ entity obtains a MAC PDU, then the HARQ process is set to "pending" status. Since LBT fails and the transmission is never performed, it is not possible for gNB to detect the UL transmission and nor the conditions that make the associated HARQ process "pending".

For a pending HARQ process, CGRT is not started. At each transmission for a HARQ process using a CG, CGRT can restart only if LBT succeeds; otherwise CGRT remains stopped. Therefore, if LBT fails, the UE can autonomously retransmit for the HARQ process on the next CG occasion. If the transmission is successful, then the ('GT starts and the HARQ processes status becomes "non-pending". Note that HARQ process status never changes back to "pending" after one-time LBT success. At the time when ('GT expires, the HARQ buffer of the previous transmission is flushed and a new transmission of a new MAC PDU is initialized.

3GPP TS 38.321 (v16.4.0) section 5.4.2.1 specifies that, for UL CGs configured with CGRT, the UE shall prioritize retransmission before initial transmissions and thus deliver only one grant with the associated HARQ process information to the HARQ entity. If there are more than one HARQ processes with retransmissions, the UE implementation selects an HARQ Process ID among the HARQ process IDs identified by the CG configuration (e.g., in FIG. 7). The grant prioritization procedure is clear.

According to 3GPP TS 38.321 (v16.4.0) section 5.4.1, to perform LCH-based prioritizations within one CG occasion, two "virtual" grants with their associated HARQ process information and the LCH-priority of the data are delivered to the later part of "the UL grant reception". Even so, Applicant has recognized that it is currently unclear how the UE should prioritize between retransmission and transmission HARQ processes within one CG.

Consider a first example that further illustrates these problems, issues, and/or difficulties. Suppose there are two HARQ processes delivered to the HARQ entity. One HARQ process is for initial transmission and another HARQ process is for re-transmission. Both processes satisfy the following conditions in 3GPP TS 38.321 (v16.4.0) section 5.4.1.

> 2> else if the cg-RetransmissionTimer for the corresponding HARQ process is configured and not running, then for the corresponding HARQ process:
>> 3> if the configuredGrantTimer is not running, and the HARQ process is not pending (i.e. new transmission):
>>> 4> consider the NDI bit to have been toggled;
>>> 4> deliver the configured uplink grant and the associated HARQ information to the HARQ entity.

> 3> else if the previous uplink grant delivered to the HARQ entity for the same HARQ process was a configured uplink grant (i.e. retransmission on configured grant):
>> 20) 4> deliver the configured uplink grant and the associated HARQ information to the HARQ entity.

In other words, the first HARQ process needing initial transmission has CGT not running and is non-pending. The second HARQ process needing retransmission has CGT running or is pending. Neither HARQ process has a running CGRT is not running, such that they are both available for a transmission. It is unclear how to prioritize between these two HARQ processes.

Consider a second example that further illustrates these problems, issues, and/or difficulties. Suppose there are two HARQ processes needing retransmission during a single CG occasion. A first HARQ process has an expired CGRT and a running CGT; this can be thought of as a "CGRT-triggered retransmission". A second HARQ process has experienced an LBT failure but CGT has not started; this can be thought of as a "pending retransmission". It is unclear how to prioritize between these two HARQ processes.

Accordingly, embodiments of the present disclosure provide flexible and efficient techniques for LCH-based prioritization during a single CG occasion, as well as for handling of de-prioritized HARQ processes. These techniques can provide various benefits and/or advantages, including allowing a UE to fulfill requirements for higher-priority URLLC-type traffic while at the same time providing high capacity when multiplexing with lower-priority eMBB-type traffic.

In the following description, the terms "operating in unlicensed spectrum" and "operating in shared spectrum" are used interchangeably. In addition, it is assumed that a CGRT is configured to support the operation in shared spectrum, i.e., a CG is configured with a CGRT (e.g., cg-RetransmissionTimer parameter shown in FIG. 7B).

In general, for a single CG occasion, it is not possible to cancel an ongoing/already-prepared transmission and transmit another MAC PDU during the same CG occasion. Rather, embodiments provide techniques whereby a MAC entity can select PDUs to be transmitted during a CG occasion based on priority of LCH(s) to be multiplexed (for initial transmissions) and/or priority of LCH(s) that are multiplexed (for retransmissions).

Various embodiments described herein apply to prioritizations between initial transmission and retransmission, and/or between retransmission and retransmission. More generally, embodiments can be applied to a group of multiple PDU transmissions in which at least one of them is a retransmission.

In some embodiments, HARQ processes that are available for transmission (i.e., associated CGRTs not running) during a CG occasion are associated with respective priorities, which can be determined based on the following:

> Priority for a retransmission HARQ process can be determined by a highest priority of LCHs with data included (e.g., multiplexed) in a MAC PDU already stored in the HARQ process buffer.

> Priority for an initial transmission HARQ process can be determined by a highest priority of LCHs with data that can be included (e.g., multiplexed) in a MAC PDU that is not already stored in HARQ process buffer, according to the mapping restrictions as described in 3GPP TS 38.321 section 5.4.3.1.2.

Priority of a HARQ process for which no data for LCHs is multiplexed or can be multiplexed in the MAC PDU is lower than either the priority for a retransmission HARQ process or the priority for an initial transmission HARQ process determined in the manner described above.

In some cases, a retransmission HARQ process may be de-prioritized several times. In some embodiments, the CGT associated with a retransmission HARQ process is extended by one CG period when the retransmission HARQ process is de-prioritized for a CG occasion. For example, the current value of the "running" CGT can be increased by one CG period. According to 3GPP TS 38.321 (v16.4.0), a timer is always started or restarted from its initial value and count downwards till value 0. In such case, if the initial value of the CGT is $x\_1$ ms and the current value of the timer is $x\_2$ ms<$x\_1$ ms, then in these embodiments, the current value of the timer will be extended to $x\_2+p\_1$ ms, where $p\_1$ is the period (or periodicity) of the occasions of the CG.

In a variant of these embodiments, the CGT extension may be conditioned upon that the retransmission HARQ process is not pending. In another variant of these embodiments, the CGT extension may be conditioned upon that the CGT for the retransmission HARQ processes has already started.

In some embodiments, retransmission HARQ processes carrying certain MAC control elements (CE, e.g., buffer status reports) can be assigned or given higher priority than initial transmission HARQ processes. This higher priority can always be assigned, or the assignment can be initiated after one or more failed retransmissions of the PDU containing these MAC CEs (i.e., failed retransmission after a failed initial transmission).

In a variant of these embodiments, different MAC CEs can be associated with different priorities, such that a retransmission HARQ process will be assigned the (highest) priority of the MAC CE(s) that it carries. The following is an exemplary priority order of MAC CEs and LCH data, with highest priority listed first. Further details can be found in 3GPP TS 38.321 (v16.4.0) section 5.4.3.1.3.

C-RNTI MAC CE or data from UL-CCCH;

Configured Grant Confirmation MAC CE or BFR MAC CE or Multiple Entry Configured Grant Confirmation MAC CE;

Sidelink Configured Grant Confirmation MAC CE;

LBT failure MAC CE;

MAC CE for SL-BSR prioritized according to clause 5.22.1.6;

MAC CE for BSR, with exception of BSR included for padding;

Single Entry PHR MAC CE or Multiple Entry PHR MAC CE;

MAC CE for the number of Desired Guard Symbols;

MAC CE for Pre-emptive BSR; and

MAC CE for SL-BSR, with exception of SL-BSR prioritized according to clause 5.22.1.6 and SL-BSR included for padding.

In some embodiments, when priorities of an initial transmission HARQ process and a retransmission HARQ process are determined to be the same using any of the above-described techniques, the retransmission HARQ process will be selected for the CG occasion rather than the initial transmission HARQ process. There can be various rationales for this rule, including:

This allows retransmission data to be decoded/received at the gNB first. The gNB may have a soft-buffer already allocated for that HARQ process (with retransmission), but will have to allocate a new soft-buffer for an initial transmission. As such, this priority ordering can reduce memory usage at the gNB.

Since the CGT may already start for a retransmission HARQ process, this approach gives retransmissions sufficient opportunity before the HARQ process buffer is flushed upon CGT expiration. This is not an issue for initial transmission HARQ processes, for which CGT has not started yet.

This arrangement follows the Rel-16 NR-U CG principle in which retransmission always takes priority over initial transmission, but with an additional condition that the principle is applied only when retransmission and initial transmission HARQ processes have the same priority as determined by other rules or criteria.

Other embodiments address the scenario of two HARQ processes needing retransmission during a single CG occasion (the "second example" discussed above): a first retransmission HARQ process having an expired CGRT and a running CGT ("CGRT-triggered retransmission") and a second retransmission HARQ process that has experienced an LBT failure but CGT has not started ("pending retransmission"). Prioritization of these HARQ processes can be made according to various options discussed below.

In one option, the CGRT-triggered retransmission (non-pending) HARQ process is prioritized over the pending retransmission HARQ process independent (e.g., regardless) of the priorities of LCHs with data included in PDUs to be retransmitted. This approach has an advantage of having the chance to successfully transmit the CGRT-triggered retransmission before the already running CGT expires, and also follows Rel-16 NR-U CG operation principles.

In another option, the pending retransmission HARQ process is prioritized over the CGRT-triggered retransmission HARQ process independent (e.g., regardless) of the priorities of LCHs with data included in PDUs to be retransmitted. This has the advantage of making the gNB aware of the pending retransmission, for which it can provide additional resources (e.g., dynamic retransmission grants) for both first and second HARQ retransmission processes.

In some embodiments, the occasion for which an HARQ process is selected is part of two overlapping CGs. For example, the particular occasion can be one of a first plurality of occasions associated with a first CG and one of a second plurality of occasions associated with a second CG. In such embodiments, after selecting a HARQ process for transmission during the occasion in any of the ways discussed above, the UE can select resources associated with the first CG or the second CG for transmission of a PDU associated with the selected HARQ process during the occasion. This step-wise approach can reduce and/or avoid complexity associated with shared HARQ process pools, such as the UE choosing the same HARQ process for both CGs, in which case it is unclear which CG should be used.

Various features of the embodiments described above correspond to various operations illustrated in FIGS. 9-10, which show exemplary methods (e.g., procedures) for a UE and a RAN node, respectively. In other words, various features of the operations described below correspond to various embodiments described above. Furthermore, the exemplary methods shown in FIGS. 9-10 can be used cooperatively to provide various benefits, advantages, and/or solutions to problems described herein. Although FIGS. 9-10 show specific blocks in particular orders, the operations of the exemplary methods can be performed in different orders than shown and can be combined and/or divided into blocks having different functionality than shown. Optional blocks or operations are indicated by dashed lines.

In particular, FIG. 9 shows an exemplary method (e.g., procedure) for a user equipment (UE) operating in a RAN, according to various exemplary embodiments of the present disclosure. The exemplary method can be performed by a UE (e.g., wireless device, IoT device, etc.) configured as described elsewhere herein.

The exemplary method can include the operations of block 910, where the UE can obtain data for transmission during a particular one of a plurality of periodic occasions during which the UE has been granted resources for UL data transmission. The obtained data includes a first PDU associated with a first HARQ process and a second PDU associated with a second HARQ process. At least one of the first and second PDUs is for retransmission after a failed transmission during an earlier one of the plurality of occasions.

The exemplary method can also include the operations of block 920, where the UE can select the first PDU or the second PDU for transmission during the particular occasion based on at least one of the following: priorities of logical channels (LCHs) with data included in the first and second PDUs, and whether one or both of the first and second PDUs are for retransmission.

In some embodiments, the first PDU is for initial transmission and the second PDU is for retransmission, and selecting the first PDU or the second PDU in block 920 includes the operations of sub-block 921, where the UE can select a particular one of the first and second PDUs that includes data associated with a LCH having the highest of the priorities of the LCHs.

In some embodiments, the first PDU is for initial transmission and the second PDU is for retransmission, and selecting the first PDU or the second PDU in block 920 can include the operations of sub-block 922, where the UE can select the second PDU (i.e., for retransmission) when a highest priority of LCHs with data included in the first PDU (i.e., for initial transmission) is the same as a highest priority of LCHs with data included in the second PDU.

In some of these embodiments, LCHs having one or more first types of MAC CEs included in the second PDU are given higher priority than LCHs having data included in the first PDU. In a variation, this higher priority can be given only when the second PDU is for retransmission after one or more failed retransmissions during one or more earlier occasions. In some of these embodiments, the first types of MAC CEs are associated with different priorities. An exemplary priority order of MAC CE types was discussed above.

In some of these embodiments, a configured grant timer (CGT) and a configured grant retransmission timer (CGRT) associated with the first HARQ process are not running, and the first HARQ process is not pending. Additionally, a CGRT associated with the second HARQ process is not running, and either the second HARQ process is pending or a CGT associated with the second HARQ process is running. An example of this scenario was discussed in more detail above.

In some of these embodiments, the exemplary method can also include the operations of block 930, where the UE can, when the first PDU is selected (e.g., in block 920), extend the expiration time of the CGT associated with the second HARQ process by the period of the occasions. In some embodiments, extending the expiration time is based on one of the following: that the CGT associated with the second HARQ process is running, or that the second HARQ process is pending.

In other embodiments, the first and second PDUs are for retransmission, and selecting the first PDU or the second PDU in block 920 can include the operations of either sub-block 923 or sub-block 924. In sub-block 923, the UE can select the first PDU regardless of the priorities of LCHs with data included in the first and second PDUs. In sub-block 924, the UE can select the second PDU regardless of the priorities of LCHs with data included in the first and second PDUs.

In some of these embodiments, a CGT associated with the first HARQ process is running, a CGRT associated with the first HARQ process has expired, and the first HARQ process is not pending. Additionally, a CGRT and a CGT associated with the second HARQ process are not running, and the second HARQ process is pending. An example of this scenario was discussed in more detail above.

In some of these embodiments, the exemplary method can also include the operations of block 905, where the UE can perform a listen-before-talk (LBT) procedure in the granted resources during an earlier one of the occasions, such that the second PDU is pending retransmission after failure of the LBT procedure.

In some embodiments, the particular occasion can be one of a first plurality of occasions associated with a first grant of resources and one of a second plurality of occasions associated with a second grant of resources. In other words, the first and second grants have at least one common occasion, i.e., the particular occasion. In such embodiments, the exemplary method can also include the operations of block 940, where the UE can select resources from the first grant or from the second grant, based on the HARQ process associated with the selected PDU (e.g., from block 920). In such embodiments, the exemplary method can also include the operations of block 950, where the UE can transmit the selected PDU (e.g., from block 920) during the particular occasion using the selected resources (e.g., from block 940).

In addition, FIG. 10 shows an exemplary method (e.g., procedure) for a network node in a RAN, according to various exemplary embodiments of the present disclosure. The exemplary method can be performed by a network node (e.g., base station, eNB, gNB, ng-eNB, etc., or component thereof) configured as described elsewhere herein.

The exemplary method can include the operations of block 1020, where the network node can receive data from a UE during a particular one of a plurality of periodic occasions during which the network node has granted resources to the UE for UL data transmission. The data includes either a first PDU associated with a first HARQ process or a second PDU associated with a second HARQ process. At least one of the first and second PDUs is for retransmission after a failed transmission during an earlier one of the plurality of occasions. Whether the data includes the first PDU or the second PDU depends on at least one of the following: priorities of LCHs with data included in the first and second PDUs, and whether one or both of the first and second PDUs are for retransmission.

In some embodiments, the first PDU is for initial transmission and the second PDU is for retransmission, and the data includes a particular one of the first and second PDUs that includes data associated with a LCH having the highest of the priorities of the LCHs. These embodiments correspond to the UE operations of sub-block 921, discussed above.

In some embodiments, the first PDU is for initial transmission and the second PDU is for retransmission, and the data includes the second PDU (for retransmission) when a highest priority of LCHs with data included in the first PDU is the same as a highest priority of LCHs with data included in the second PDU. These embodiments correspond to the UE operations of sub-block 922, discussed above.

In some of these embodiments, LCHs having one or more first types of MAC CEs included in the second PDU are given higher priority than LCHs having data included in the first PDU. In a variation, this higher priority can be given only when the second PDU is for retransmission after one or more failed retransmissions during one or more earlier occasions. In some of these embodiments, the first types of MAC CEs are associated with different priorities. An exemplary priority order of MAC CE types was discussed above.

In some of these embodiments, a CGT and a CGRT associated with the first HARQ process are not running in the UE, and the first HARQ process is not pending in the UE.

Additionally, a CGRT associated with the second HARQ process is not running in the UE, and either the second HARQ process is pending in the UE or a CGT associated with the second HARQ process is running in the UE. An example of this scenario was discussed in more detail above.

In other embodiments, the first and second PDUs are for retransmissions and one of the following applies:

the data includes the first PDU regardless of the priorities of LCHs with data included in the first and second PDUs; or the data includes the second PDU regardless of the priorities of LCHs with data included in the first and second PDUs.

These conditions correspond to the UE operations of sub-blocks 923-924, discussed above.

In some of these embodiments, a CGT associated with the first HARQ process is running in the UE, a CGRT associated with the first HARQ process has expired in the UE, and the first HARQ process is not pending in the UE. Additionally, a CGRT and a CGT associated with the second HARQ process are not running in the UE, and the second HARQ process is pending in the UE. An example of this scenario was discussed in more detail above. In some of these embodiments, the second PDU is pending retransmission after a failed LBT procedure by the UE in the granted resources during an earlier one of the occasions.

In some embodiments, the particular occasion can be one of a first plurality of occasions associated with a first grant of resources and one of a second plurality of occasions associated with a second grant of resources. In other words, the first and second grants have at least one common occasion, i.e., the particular occasion. In such embodiments, the data is received during the particular occasion (e.g., in block 1020) on resources from the first grant or from the second grant, depending on the HARQ process associated with the PDU included in the data. In some of these embodiments, the exemplary method can also include the operations of block 1010, where the network node can send the first grant and the second grant to the UE.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 11:
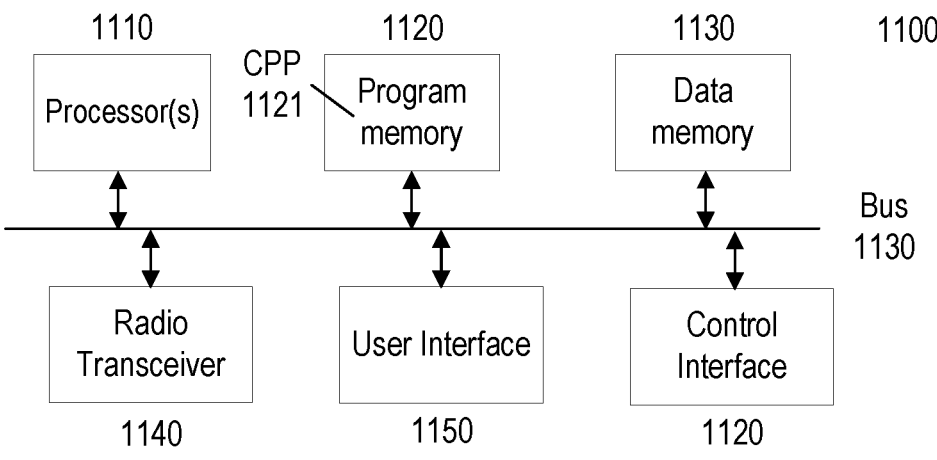
FIG. 11 shows a block diagram of an exemplary UE (e.g., wireless device), according to various exemplary embodiments of the present disclosure.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods described herein.

UE 1100 can include a processor 1110 (also referred to as "processing circuitry") that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations corresponding to various exemplary methods described herein. As part of or in addition to such operations, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, SDAP, RRC, and NAS layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or control interface 1160. Program memory 1120 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1130 can include memory area for processor 1110 to store variables used in protocols, configuration, control, and other functions of UE 1100, including operations corresponding to, or comprising, any of the exemplary methods described herein. Moreover, program memory 1120 and/or data memory 1130 can include non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like 20) wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1130.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods described herein or otherwise known to persons of ordinary skill.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including any program code corresponding to and/or embodying any exemplary embodiments (e.g., of methods) described herein.

Figure 12:
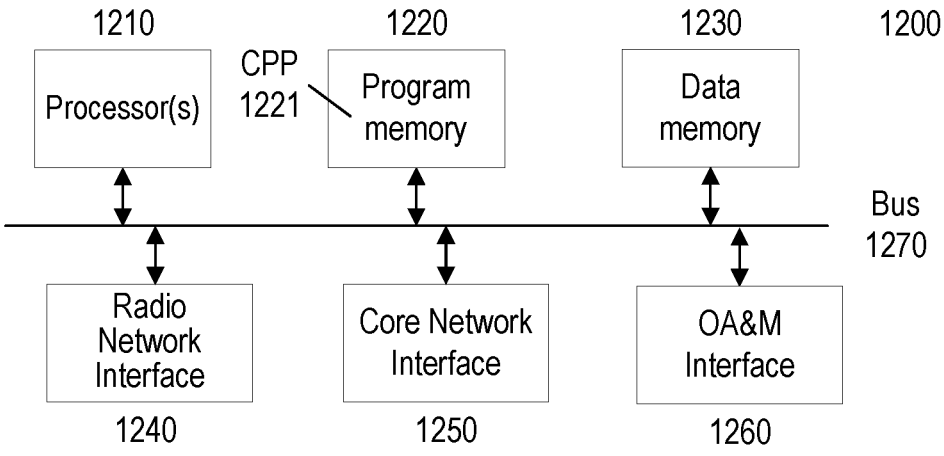
FIG. 12 shows a block diagram of an exemplary network node (e.g., base station, eNB, gNB, ng-eNB, etc.), according to various exemplary embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods described herein. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations, including operations corresponding to various exemplary methods described herein. As part of and/or in addition to such operations, program memory 1220 can also include software code executed by processor 1210 that can configure and/or facilitate network node 1200 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1240 and/or core network interface 1250. By way of example, core network interface 1250 can comprise the S1 or NG interface and radio network interface 1240 can comprise the Uu interface, as standardized by 3GPP. Program memory 1220 can also comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the SI interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1200 can include hardware and/or software that configures and/or facilitates network node 1200 to communicate with other network nodes in a RAN, such as with other eNBs, gNBs, ng-eNBs, en-gNBs, IAB nodes, etc. Such hardware and/or software can be part of radio network interface 1240 and/or core network interface 1250, or it can be a separate functional unit (not shown). For example, such hardware and/or software can configure and/or facilitate network node 1200 to communicate with other RAN nodes via the X2 or Xn interfaces, as standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
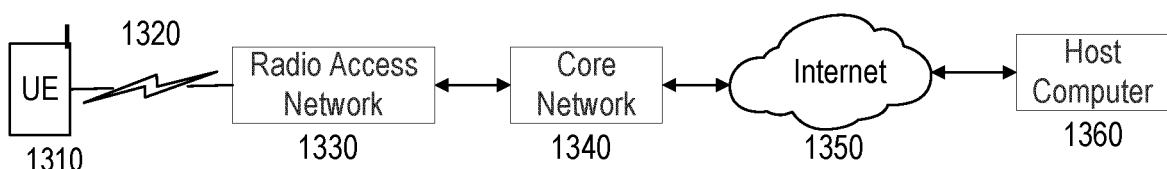
FIG. 13 shows a block diagram of an exemplary network configured to provide over-the-top (OTT) data services between a host computer and a UE, according to various exemplary embodiments of the present disclosure.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, ng-eNBs, etc.) comprising RAN 1330 can communicate to core network 1340 via core network interface 1350 described above. In some exemplary embodiments, RAN 1330 and core network 1340 can be configured and/or arranged as shown in other figures discussed above. For example, eNBs comprising an evolved UTRAN (E-UTRAN) 1330 can communicate with an evolved packet core (EPC) network 1340 via an S1 interface. As another example, gNBs and ng-eNBs comprising an NG-RAN 1330 can communicate with a 5GC network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques for logical channel (LCH)-based prioritization during a single UL configured grant (CG) occasion, as well as for handling of de-prioritized HARQ processes. These techniques can provide various benefits and/or advantages, including allowing a UE to fulfill requirements for higher-priority URLLC-type UL traffic while at the same time providing high capacity when multiplexing with lower-priority eMBB-type UL traffic. When used in NR UEs (e.g., UE 1310) and gNBs (e.g., gNBs comprising RAN 1330), these improvements can increase the use of OTT data services by providing better latency, reliability, and/or quality of service (QOS) to OTT service providers and end users. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) operating in a radio access network (RAN), the method comprising:

obtaining data for transmission during a particular one of a plurality of periodic occasions during which the UE has been granted resources for UL data transmission, wherein:

the data includes a first protocol data unit (PDU) associated with a first hybrid ARQ (HARQ) process and a second PDU associated with a second HARQ process, and at least one of the first and second PDUs is for retransmission after a failed transmission during an earlier one of the plurality of occasions; and selecting the first PDU or the second PDU for transmission during the particular occasion based on the following:

priorities of logical channels (LCHs) with data included in the first and second PDUs, and whether one or both of the first and second PDUs are for retransmission.

A2. The method of embodiment A1, wherein:

the first PDU is for initial transmission, a configured grant timer (CGT) and a configured grant retransmission timer (CGRT) associated with the first HARQ process are not running, and the first HARQ process is not pending; and the second PDU is for retransmission, a CGRT associated with the second HARQ process is not running, and either the second HARQ process is pending or a CGT associated with the second HARQ process is running.

A3. The method of embodiment A2, wherein selecting the first PDU or the second PDU comprises selecting a particular one of the first and second PDUs that includes data associated with a LCH having the highest of the priorities of the LCHs.

A4. The method of any of embodiment A3, wherein selecting the first PDU or the second PDU further comprises selecting the second PDU when a highest priority of LCHs with data included in the first PDU is the same as a highest priority of LCHs with data included in the second PDU.

A5. The method of any of embodiments A3-A4, wherein LCHs having one or more first types of medium access control (MAC) control elements (CEs) included in the second PDU are given higher priority than LCHs having data included in the first PDU.

A6. The method of any of embodiments A3-A4, wherein LCHs having one or more first types of medium access control (MAC) control elements (CEs) included in the second PDU are given higher priority than LCHs having data included in the first PDU, when the second PDU is for retransmission after one or more failed retransmissions during one or more earlier occasions.

A7. The method of any of embodiments A5-A6, wherein the first types of MAC CEs are associated with different priorities.

A8. The method of any of embodiments A3-A7, wherein the method further comprises, when the first PDU is selected, extending the expiration time of the CGT associated with the second HARQ process by the period of the occasions.

A9. The method of embodiment A8, wherein extending the expiration time is based on one of the following: that the CGT associated with the second HARQ process is running, or that the second HARQ process is pending.

A10. The method of embodiment A1, wherein:

the first PDU is for retransmission, a configured grant timer (CGT) associated with the first HARQ process is running, a configured grant retransmission timer (CGRT) associated with the first HARQ process has expired, and the first HARQ process is not pending; and the second PDU is for retransmission, a CGRT and a CGT associated with the second HARQ process are not running, and the second HARQ process is pending.

A11. The method of embodiment A10, wherein selecting the first PDU or the second PDU comprises one of the following:

selecting the first PDU regardless of the priorities of LCHs with data included in the first and second PDUs; or selecting the second PDU regardless of the priorities of LCHs with data included in the first and second PDUs.

A12. The method of any of embodiments A1-A11, wherein:

the particular occasion is one of a first plurality of occasions associated with a first grant of resources and one of a second plurality of occasions associated with a second grant of resources;

the method further comprises after selecting the first or second PDU, selecting resources associated with the first grant or the second grant for transmission of the selected PDU during the particular occasion.

A13. The method of any of embodiments A1-A12, further comprising transmitting the selected PDU during the particular occasion using resources associated with the particular occasion.

B1. A method for a network node in a radio access network (RAN), the method comprising:

receiving data, from a user equipment (UE), during a particular one of a plurality of periodic occasions during which the network node has granted resources to the UE for uplink (UL) data transmission, wherein:

the data includes either a first protocol data unit (PDU) associated with a first hybrid ARQ (HARQ) process or a second PDU associated with a second HARQ process, at least one of the first and second PDUs is for retransmission after a failed transmission during an earlier one of the plurality of occasions, and whether the data includes the first PDU or the second PDU depends on the following:

priorities of logical channels (LCHs) with data included in the first and second PDUs, and whether one or both of the first and second PDUs are for retransmission.

B2. The method of embodiment B1, wherein:

the first PDU is for initial transmission, a configured grant timer (CGT) and a configured grant retransmission timer (CGRT) associated with the first HARQ process are not running in the UE, and the first HARQ process is not pending in the UE; and the second PDU is for retransmission, a CGRT associated with the second HARQ process is not running in the UE, and either the second HARQ process is pending in the UE or a CGT associated with the second HARQ process is running in the UE.

B3. The method of embodiment B2, wherein the data includes a particular one of the first and second PDUs that includes data associated with a LCH having the highest of the priorities of the LCHs.

B4. The method of any of embodiment B3, wherein the data includes the second PDU when a highest priority of LCHs with data included in the first PDU is the same as a highest priority of LCHs with data included in the second PDU.

B5. The method of any of embodiments B3-B4, wherein LCHs having one or more first types of medium access control (MAC) control elements (CEs) included in the second PDU are given higher priority than LCHs having data included in the first PDU.

B6. The method of any of embodiments B3-B4, wherein LCHs having one or more first types of medium access control (MAC) control elements (CEs) included in the second PDU are given higher priority than LCHs having data included in the first PDU, when the second PDU is for retransmission after one or more failed retransmissions during one or more earlier occasions.

B7. The method of any of embodiments B5-B6, wherein the first types of MAC CEs are associated with different priorities.

B8. The method of embodiment B1, wherein:

the first PDU is for retransmission, a configured grant timer (CGT) associated with the first HARQ process is running in the UE, a configured grant retransmission timer (CGRT) associated with the first HARQ process has expired in the UE, and the first HARQ process is not pending in the UE; and the second PDU is for retransmission, a CGRT and a CGT associated with the second HARQ process are not running in the UE, and the second HARQ process is pending in the UE.

B9. The method of embodiment B8, wherein one of the following applies:

the data includes the first PDU regardless of the priorities of LCHs with data included in the first and second PDUs; or the data includes the second PDU regardless of the priorities of LCHs with data included in the first and second PDUs.

B10. The method of any of embodiments B1-B9, wherein:

the particular occasion is one of a first plurality of occasions associated with a first grant of resources and one of a second plurality of occasions associated with a second grant of resources;

the data is received during the particular occasion on resources associated with the first grant or the second grant.

B11. The method of embodiment B10, further comprising sending the first grant and the second grant to the UE.

C1. A user equipment (UE) configured to operate in a radio access network (RAN), the UE comprising:

radio transceiver circuitry configured to communicate with a network node of the RAN; and processing circuitry operatively coupled to the radio transceiver circuitry, whereby the processing circuitry and the radio transceiver circuitry are configured to perform operations corresponding to any of the methods of embodiments A1-A13.

C2. A user equipment (UE) configured to operate in a radio access network (RAN), the UE being further configured to perform operations corresponding to any of the methods of embodiments A1-A13.

C3. A non-transitory, computer-readable medium storing computer-executable instructions that, when executed by processing circuitry of a user equipment (UE) configured to operate in a radio access network (RAN), configure the UE to perform operations corresponding to any of the methods of embodiments A1-A13.

C4. A computer program product comprising computer-executable instructions that, when executed by processing circuitry of a user equipment (UE) configured to operate in a radio access network (RAN), configure the UE to perform operations corresponding to any of the methods of embodiments A1-A13.

D1. A network node configured to operate in a radio access network (RAN), the network node comprising:

radio network interface circuitry configured to communicate with user equipment (UEs); and processing circuitry operatively coupled to the radio network interface circuitry, whereby the processing circuitry and the radio network interface circuitry are configured to perform operations corresponding to any of the methods of embodiments B1-B11.

D2. A network node configured to operate in a radio access network (RAN), the network node being further configured to perform operations corresponding to any of the methods of embodiments B1-B11.

D3. A non-transitory, computer-readable medium storing computer-executable instructions that, when executed by processing circuitry of a network node configured to operate in a radio access network (RAN), configure the network node to perform operations corresponding to any of the methods of embodiments B1-B11.

D4. A computer program product comprising computer-executable instructions that, when executed by processing circuitry of a network node configured to operate in a radio access network (RAN), configure the network node to perform operations corresponding to any of the methods of embodiments B1-B11.

The invention claimed is:

1. A method for a user equipment (UE) configured to operate in a radio access network (RAN), the method comprising:

obtaining data for transmission during a particular one of a plurality of periodic occasions during which the UE has been granted resources for uplink (UL) data transmission, wherein:

the particular occasion is one of a first plurality of occasions associated with a first grant of resources and one of a second plurality of occasions associated with a second grant of resources;

the data includes a first protocol data unit (PDU) associated with a first hybrid ARQ (HARQ) process and a second PDU associated with a second HARQ process, and the second PDU is for retransmission after a failed transmission during an earlier one of the plurality of occasions;

selecting resources from the first grant or from the second grant, based on the HARQ process associated with the selected PDU;

selecting the first PDU or the second PDU for transmission during the particular occasion based on priorities of logical channels (LCHs) with data included in the first and second PDUs, comprising selecting the second PDU when a highest priority of logical channels (LCHs) with data included in the first PDU is the same as a highest priority of LCHs with data included in the second PDU; and transmitting the selected PDU during the particular occasion using the selected resources.

2. The method of claim 1, wherein the first PDU is for initial transmission, and selecting the first PDU or the second PDU for transmission during the particular occasion comprises selecting a particular one of the first and second PDUs that includes data associated with a LCH having the highest of the priorities of the LCHs with data included in the first and second PDUs.

3. The method of claim 1, wherein:

the first PDU is for initial transmission, and

LCHs having one or more first types of medium access control (MAC) control elements (CEs) included in the second PDU are given higher priority than LCHs having data included in the first PDU.

4. The method of claim 3, wherein the first types of MAC CEs are associated with different priorities.

5. The method of claim 1, wherein:

the first PDU is for initial transmission;

a configured grant timer (CGT) and a configured grant retransmission timer (CGRT) associated with the first HARQ process are not running in the UE;

the first HARQ process is not pending in the UE;

a CGRT associated with the second HARQ process is not running in the UE; and one of the following applies:

the second HARQ process is pending in the UE, or a CGT associated with the second HARQ process is running in the UE.

6. The method of claim 5, further comprising, when the first PDU is selected, extending an expiration time of the CGT associated with the second HARQ process by a period of the periodic occasions.

7. The method of claim 6, wherein extending the expiration time is based on one of the following: that the CGT associated with the second HARQ process is running in the UE, or that the second HARQ process is pending in the UE.

8. The method of claim 1, wherein:

the first PDU is for retransmission after a failed transmission during an earlier one of the plurality of occasions; and selecting the first PDU or the second PDU further comprises one of the following:

selecting the first PDU regardless of the priorities of LCHs with data included in the first and second PDUs; or selecting the second PDU regardless of the priorities of LCHs with data included in the first and second PDUs.

9. The method of claim 8, wherein:

a configured grant timer (CGT) associated with the first HARQ process is running in the UE;

a configured grant retransmission timer (CGRT) associated with the first HARQ process has expired in the UE;

a CGRT and a CGT associated with the second HARQ process are not running in the UE; and the first HARQ process is not pending and the second HARQ process is pending in the UE.

10. The method of claim 9, further comprising performing a listen-before-talk (LBT) procedure in the granted resources during an earlier one of the occasions, wherein the second PDU is pending retransmission after failure of the LBT procedure.

11. A method for a network node configured to operate in a radio access network (RAN), the method comprising:

receiving data from a user equipment (UE) during a particular one of a plurality of periodic occasions during which the network node has granted resources to the UE for uplink (UL) data transmission, wherein:

the particular occasion is one of a first plurality of occasions associated with a first grant of resources and one of a second plurality of occasions associated with a second grant of resources;

the data includes either a first protocol data unit (PDU) associated with a first hybrid ARQ (HARQ) process or a second PDU associated with a second HARQ process, the second PDUs is for retransmission after a failed transmission during an earlier one of the plurality of occasions, the data includes the second PDU when a highest priority of logical channels (LCHs) with data included in the first PDU is the same as a highest priority of LCHs with data included in the second PDU, and the data is received during the particular occasion on resources from the first grant or from the second grant, depending on the HARQ process associated with the PDU included in the data.

12. The method of claim 11, wherein the first PDU is for initial transmission, and the data includes a particular one of the first and second PDUs that includes data associated with a LCH having the highest of the priorities of the LCHs.

13. The method of claim 11, wherein:

the first PDU is for initial transmission, and

LCHs having one or more first types of medium access control (MAC) control elements (CEs) included in the second PDU are given higher priority than LCHs having data included in the first PDU.

14. The method of claim 13, wherein the first types of MAC CEs are associated with different priorities.

15. The method of claim 11, wherein:

the first PDU is for initial transmission;

a configured grant timer (CGT) and a configured grant retransmission timer (CGRT) associated with the first HARQ process are not running in the UE;

the first HARQ process is not pending in the UE;

a CGRT associated with the second HARQ process is not running in the UE; and one of the following applies:

the second HARQ process is pending in the UE, or a CGT associated with the second HARQ process is running in the UE.

16. The method of claim 11, wherein:

the first PDU is for retransmission after a failed transmission during an earlier one of the plurality of occasions; and one of the following applies:

the data includes the first PDU regardless of the priorities of LCHs with data included in the first and second PDUs; or the data includes the second PDU regardless of the priorities of LCHs with data included in the first and second PDUs.

17. The method of claim 16, wherein:

a configured grant timer (CGT) associated with the first HARQ process is running in the UE;

a configured grant retransmission timer (CGRT) associated with the first HARQ process has expired in the UE;

a CGRT and a CGT associated with the second HARQ process are not running in the UE; and the first HARQ process is not pending and the second HARQ process is pending in the UE.

18. The method of claim 17, wherein the second PDU is pending retransmission after a failed listen-before-talk (LBT) procedure by the UE in the granted resources during an earlier one of the occasions.

19. The method of claim 11, further comprising sending the first grant and the second grant to the UE.

20. A network node configured to operate in a radio access network (RAN), the network node comprising:

radio network interface circuitry configured to communicate with user equipment (UEs); and processing circuitry operatively coupled to the radio network interface circuitry, whereby the processing circuitry and the radio network interface circuitry are configured to perform the method of claim 11.

21. A user equipment (UE) configured to operate in a radio access network (RAN), the UE comprising:

radio transceiver circuitry configured to communicate with a network node of the RAN; and processing circuitry operatively coupled to the radio transceiver circuitry, whereby the processing circuitry and the radio transceiver circuitry are configured to:

obtain data for transmission during a particular one of a plurality of periodic occasions during which the UE has been granted resources for uplink (UL) data transmission, wherein:

the particular occasion is one of a first plurality of occasions associated with a first grant of resources and one of a second plurality of occasions associated with a second grant of resources;

the data includes a first protocol data unit (PDU) associated with a first hybrid ARQ (HARQ) process and a second PDU associated with a second HARQ process, and the second PDU is for retransmission after a failed transmission during an earlier one of the plurality of occasions;

select resources from the first grant or from the second grant, based on the HARQ process associated with the selected PDU;

select the first PDU or the second PDU for transmission during the particular occasion based on priorities of logical channels (LCHs) with data included in the first and second PDUs, based on selecting the second PDU when a highest priority of logical channels (LCHs) with data included in the first PDU is the same as a highest priority of LCHs with data included in the second PDU; and transmit the selected PDU during the particular occasion using the selected resources.

* * * * *